(12) United States Patent
Taguchi et al.

(10) Patent No.: US 6,923,854 B2
(45) Date of Patent: Aug. 2, 2005

(54) INKJET INK SET AND INKJET RECORDING METHOD

(75) Inventors: Toshiki Taguchi, Shizuoka (JP); Manabu Ogawa, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 15 days.

(21) Appl. No.: 10/805,251

(22) Filed: Mar. 22, 2004

(65) Prior Publication Data

US 2005/0001890 A1 Jan. 6, 2005

(30) Foreign Application Priority Data

Mar. 24, 2003 (JP) ..................................... P.2003-080675

(51) Int. Cl.$^7$ .............................................. C09D 11/02
(52) U.S. Cl. ................................ 106/31.43; 106/31.47; 106/31.49
(58) Field of Search ........................... 106/31.43, 31.47, 106/31.49

(56) References Cited

U.S. PATENT DOCUMENTS

| | | | | |
|---|---|---|---|---|
| 5,980,623 A | * | 11/1999 | Hiraoka et al. | 106/31.49 |
| 6,039,793 A | * | 3/2000 | Gundlach et al. | 106/31.28 |
| 2004/0011248 A1 | * | 1/2004 | Taguchi et al. | 106/31.28 |
| 2004/0055508 A1 | * | 3/2004 | Miyamoto et al. | 106/31.47 |
| 2004/0080595 A1 | * | 4/2004 | Taguchi et al. | 347/100 |
| 2004/0189765 A1 | * | 9/2004 | Taguchi et al. | 347/100 |
| 2004/0194660 A1 | * | 10/2004 | Taguchi et al. | 106/31.43 |
| 2004/0200385 A1 | * | 10/2004 | Taguchi et al. | 106/31.43 |

FOREIGN PATENT DOCUMENTS

| | | | |
|---|---|---|---|
| EP | 001375608 A1 | * | 1/2004 |
| EP | 001378550 A1 | * | 1/2004 |
| EP | 001473336 A1 | * | 11/2004 |

* cited by examiner

*Primary Examiner*—Helene Klemanski
(74) *Attorney, Agent, or Firm*—Sughrue Mion, PLLC

(57) ABSTRACT

An inkjet ink set comprising at least two inkjet inks having the same color hue but different dye concentration and each comprising water, a water-soluble organic solvent, a dye and a betaine compound, wherein concentration of the betaine compound in an ink having a highest dye concentration is higher than that in an ink having a lowest dye concentration.

11 Claims, No Drawings

INKJET INK SET AND INKJET RECORDING METHOD

FIELD OF THE INVENTION

The present invention relates to an inkjet ink set and an inkjet recording method, which ensure excellent durability of images under high-humidity conditions.

BACKGROUND OF THE INVENTION

With the recent popularization of computers, an inkjet printer is widely used for printing letters or an image on paper, film, cloth or the like not only at offices but also at homes.

The inkjet recording method includes a system of jetting out a liquid droplet by applying a pressure using a piezoelectric element, a system of jetting out a liquid droplet by, generating a bubble in an ink under heat, a system of using an ultrasonic wave, and a system of ejecting a liquid droplet by drawing with an electrostatic force. The ink composition used for such inkjet recording includes an aqueous ink, an oily ink and a solid (fusion-type) ink. Among these inks, the aqueous ink becomes mainstream in view of production, handleability, odor, safety and the like.

The coloring agent used in such an ink for inkjet recording method is required to have high solubility in a solvent, enable high-density recording, provide good color hue, exhibit excellent fastness to light, heat, air, water and chemicals, ensure good fixing property and less bleeding on an image-receiving material, provide an ink having excellent storability, show no toxicity, have high purity, and be available at a low cost. However, it is very difficult to find out a coloring agent satisfying these requirements in a high level.

Various dyes and pigments for inkjet recording method have been already proposed and actually used, however, a coloring agent satisfying all requirements is not yet found out at present. Conventionally well-known dyes and pigments having a Colour Index (C.I.) number can hardly satisfy both color hue and fastness required of the ink for inkjet recording method. Heretofore, various studies have been made on dyes having good color hue and fastness with an attempt to develop a dye excellent as the coloring agent for inkjet recording method. However, in a compound called a water-soluble dye, a water-soluble group is necessarily substituted. When the number of water-soluble groups is increased so as to improve the stability of ink, it has been found to cause a problem in that the formed image readily bleeds under high-humidity conditions.

The present inventors have found that a betaine compound is effective for solving the bleeding phenomenon.

However, it is revealed that when a betaine compound is used in an ink set comprising dark and light inks having the same color hue, a sufficiently high effect of restraining the bleeding cannot be obtained unless the concentration of betaine compound in each ink is controlled.

SUMMARY OF THE INVENTION

An object of the present invention is to provide an inkjet ink set and an inkjet recording method, where the image formed less bleeds even under high-humidity conditions.

Other objects of the present invention will become apparent from the following description.

The objects of the present invention can be attained by the inkjet ink set and the inkjet recording method described in the following items 1 to 5.

1) An inkjet ink set comprising at least two inkjet inks having the same color hue but different dye concentration and each comprising water, a water-soluble organic solvent, a dye and a betaine compound, wherein concentration of the betaine compound in an ink having a highest dye concentration is higher than that in an ink having a lowest dye concentration.

2) The ink set as described in 1), wherein at least one of the betaine compounds is a compound represented by the following formula (1):

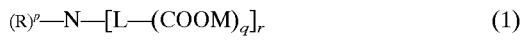

$$(R)^p-N-[L-(COOM)_q]_r \qquad (1)$$

wherein R represents a hydrogen atom, an alkyl group, an aryl group or a heterocyclic group; L represents a divalent linking group; M represents a hydrogen atom, an alkali metal atom, an ammonium group, a protonated organic amine or nitrogen-containing heterocyclic group or a quaternary ammonium ion group, provided that when the COOM forms a counter ion (COO⁻) to an ammonium ion formed by the N atom (protonated ammonium atom (=N⁺=)) in the formula, M is not present; q represents an integer of 1 or more; r represents an integer of 1 to 4; p represents an integer of 0 to 4, provided that p+r is 3 or 4; when p+r is 4, the N atom forms a protonated ammonium atom (=N⁺=); when q is 2 or more, COOMs may be the same or different; when is 2 or more, L—(COOM)$_q$s may be the same or different; and when p is 2 or more; Rs may be the same or different.

3) The ink set as described in 1) or 2), wherein among the inks having the same color hue, the concentration of the betaine compound increases with increase in the dye concentration.

4) The inkjet ink set as described in any one of 1) to 3), wherein the betaine compound is a betaine-base surfactant.

5) The ink-set as described in 1) or 3), wherein the betaine compound is a compound having both a cationic site and an anionic site in the molecule thereof.

6) The ink set as described in 5), wherein the cationic site is at least one member selected from an aminic nitrogen atom, a nitrogen atom of a heteroaromatic ring, a boron atom having 4 bonds to carbon and a phosphoric atom and the anionic site is at least one member selected from a hydroxyl group, a thio group, a sulfonamido group, a sulfo group, a carboxyl group, an imido group, a phosphoric acid group and a phosphonic acid group.

7) The ink set as described in any one of 1) to 6), wherein the dye is a dye having an oxidation potential more positive then 1.0 V (vs SCE).

8) The ink set as described in any one of 1) to 7), wherein the dye is a dye having at least two heterocyclic groups.

9) The ink set as described in 8), wherein at least one of the heterocyclic groups is a 5-membered or 6-membered heterocyclic group containing at least one hetero atom selected from a nitrogen atom, an oxygen atom and a sulfur atom.

10) The ink set as described in 9), wherein the heterocyclic group contains at least one heterocyclic ring selected from pyridine, thiophene, thiazole, benzothiazole, benzoxazole and furan.

11) An inkjet recording method comprising recording an image by an inkjet printer using the ink set described in any one of 1) to 10).

DETAILED DESCRIPTION OF THE INVENTION

The present invention is described in detail below.

The ink for use in the inkjet ink set of the present invention comprises water, a water-soluble organic solvent, a dye and a betaine compound.

The term "betaine compound" as used herein means a compound having both a cationic site and an anionic site in the molecule thereof. Among these compounds, a compound having surface activity is preferred. Examples of the cationic site include an aminic nitrogen atom, a nitrogen atom of a heteroaromatic ring, a boron atom having 4 bonds to carbon, and a phosphoric atom. Among these, preferred are an aminic nitrogen atom and a nitrogen atom of a heteroaromatic ring, more preferred is a quaternary nitrogen atom. Examples of the anionic site include a hydroxyl group, a thio group, a sulfonamido group, a sulfo group, a carboxyl group, an imido group, a phosphoric acid group and a phosphonic acid group. Among these, preferred are a carboxyl group and a sulfo group. The electric charge of the surfactant molecule as a whole may be cationic, anionic or neutral but is preferably neutral.

The betaine compound is preferably a compound represented by formula (1).

In formula (1), R represents a hydrogen atom, an alkyl group, an aryl group or a heterocyclic group; L represents a divalent linking group; M represents a hydrogen atom, an alkali metal atom, an ammonium group, a protonated organic amine or nitrogen-containing heterocyclic group or a quaternary ammonium ion group, provided that when the COOM forms a counter ion (COO$^-$) to an ammonium ion formed by the N atom (protonated ammonium atom (=N$^+$=) in the formula, M is not present; q represents an integer of 1 or more; r represents an integer of 1 to 4; p represents an integer of 0 to 4, provided that p+r is 3 or 4; when p+r is 4, the N atom becomes a protonated ammonium atom (=N$^+$=); when q is 2 or more, COOMs may be the same or different; when r is 2 or more, L—(COOM)$_q$s may be the same or different; and when p is 2 or more, Rs may be the same or different.

Among the compounds represented by formula (1), the betaine compound for use in the present invention is more preferably a compound represented by the following formula (2) or (3).

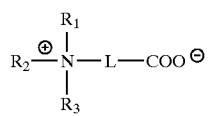

(2)

In formula (2), $R_1$ to $R_3$ each represent an alkyl group (which may be substituted; preferably an alkyl group having from 1 to 20 carbon atoms, e.g., methyl, ethyl, propyl, butyl, hexyl, octyl, dodecyl, cetyl, stearyl, oleyl), an aryl group (which may be substituted; preferably an aryl group having from 6 to 20 carbon atoms, e.g., phenyl, tolyl, xylyl, naphthyl, cumyl, dodecylphenyl) or a heterocyclic group (which may be substituted; preferably a heterocyclic group having from 2 to 20 carbon atoms, e.g., pyridyl, quinolyl), or $R_1$ to $R_3$ may combine with each other to form a cyclic structure. $R_1$ to $R_3$ each preferably represent an alkyl group. L represents a divalent linking group. L is preferably a divalent linking group containing an alkylene group or an arylene group as a fundamental constituent unit. In the linking main chain part, a heteroatom such as oxygen atom, sulfur atom and nitrogen atom may be contained. $R_1$ to $R_3$ and L each may be substituted by various substituents. Examples of the substituent include an alkyl group (preferably having from 1 to 20 carbon atoms, more preferably from 1 to 12 carbon atoms, still more preferably from 1 to 8 carbon atoms, e.g., methyl, ethyl, isopropyl, tert-butyl, n-octyl, n-decyl, n-hexadecyl, cyclopropyl, cyclopentyl, cyclohexyl), an alkenyl group (preferably having from 2 to 20 carbon atoms, more preferably from 2 to 12 carbon atoms, still more preferably from 2 to 8 carbon atoms, e.g., vinyl, allyl, 2-butenyl, 3-pentenyl), an alkynyl group (preferably having from 2 to 20 carbon atoms, more preferably from 2 to 12 carbon atoms, still more preferably from 2 to 8 carbon atoms, e.g., propargyl, 3-pentynyl), an aryl group (preferably having from 6 to 30 carbon atoms, more preferably from 6 to 20 carbon atoms, still more preferably from 6 to 12 carbon atoms, e.g., phenyl, p-methylphenyl, naphthyl), an amino group (preferably having from 0 to 20 carbon atoms, more preferably from 0 to 12 carbon atoms, still more preferably from 0 to 6 carbon atoms, e.g., amino, methylamino, dimethylamino, diethylamino, diphenylamino, dibenzylamino), an alkoxy group (preferably having from 1 to 20 carbon atoms, more preferably from 1 to 12 carbon atoms, still more preferably from 1 to 8 carbon atoms e.g., methoxy, ethoxy, butoxy), an aryloxy group (preferably having from 6 to 20 carbon atoms, more preferably from 6 to 16 carbon atoms, still more preferably from 6 to 12 carbon atoms, e.g., phenyloxy, 2-naphthyloxy), an acyl group (preferably having from 1 to 20 carbon atoms, more preferably from 1 to 16 carbon atoms, still more preferably from 1 to 12 carbon atoms, e.g., acetyl, benzoyl, formyl, pivaloyl), an alkoxycarbonyl group (preferably having from 2 to 20 carbon atoms, more preferably from 2 to 16 carbon atoms, still more preferably from 2 to 12 carbon atoms, e.g., methoxycarbonyl, ethoxycarbonyl), an aryloxycarbonyl group (preferably having from 7 to 20 carbon atoms, more preferably from 7 to 16 carbon atoms, still more preferably from 7 to 10 carbon atoms, e.g., phenyloxycarbonyl), an acyloxy group (preferably having from 2 to 20 carbon atoms, more preferably from 2 to 16 carbon atoms, still more preferably from 2 to 10 carbon atoms, e.g., acetoxy, benzoyloxy), an acylamino group (preferably having from 2 to 20 carbon atoms, more preferably from 2 to 16 carbon atoms, still more preferably from 2 to 10 carbon atoms, e.g., acetylamino, benzoylamino), an alkoxycarbonylamino group (preferably having from 2 to 20 carbon atoms, more preferably from 2 to 16 carbon atoms, still more preferably from 2 to 12 carbon atoms, e.g., methoxycarbonylamino), an aryloxycarbonylamino group (preferably having from 7 to 20 carbon atoms, more preferably from 7 to 16 carbon atoms, still more preferably from 7 to 12 carbon atoms, e.g., phenyloxycarbonylamino), a sulfonylamino group (preferably having from 1 to 20 carbon atoms, more preferably from 1 to 16 carbon atoms, still more preferably from 1 to 12 carbon atoms, e.g., methanesulfonylamino, benzenesulfonylamino), a sulfamoyl group (preferably having from 0 to 20 carbon atoms, more preferably from 0 to 16 carbon atoms, still more preferably from 0 to 12 carbon atoms, e.g., sulfamoyl, methylsulfamoyl, dimethylsulfamoyl, phenylsulfamoyl), a carbamoyl group (preferably having from 1 to 20 carbon atoms, more preferably from 1 to 16 carbon atoms, still more preferably from 1 to 12 carbon atoms, e.g., carbamoyl, methylcarbamoyl, diethylcarbamoyl, phenylcarbamoyl), an alkylthio group (preferably having from 1 to 20 carbon atoms, more preferably from 1 to 16 carbon atoms, still more preferably from 1 to 12 carbon atoms, e.g., methylthio, ethylthio), an arylthio group (preferably having from 6 to 20 carbon atoms, more preferably from 6 to 16 carbon atoms, still more preferably from 6 to 12 carbon atoms, e.g., phenylthio), a sulfonyl group (preferably having from 1 to 20 carbon atoms, more preferably from 1 to 16 carbon atoms, still more preferably from 1 to 12 carbon atoms, e.g., mesyl, tosyl), a sulfinyl group (preferably having from 1 to 20 carbon atoms, more preferably from 1 to 6 carbon atoms, still more preferably from 1 to 12 carbon atoms, e.g., methanesulfinyl, benzenesulfinyl), a ureido group (preferably having from 1 to 20 carbon atoms, more preferably from 1 to 16 carbon atoms, still more preferably from 1 to 12 carbon atoms, e.g., ureido, methylureido, phenylureido), a phosphoric acid amido group (preferably having from 1 to 20 carbon atoms, more preferably from 1 to 16 carbon atoms, still more preferably from 1 to 12 carbon atoms, e.g., diethylphosphoric acid amido, phenylphosphoric acid amido), a hydroxy group, a mercapto group, a halogen atom (e.g., fluorine, chlorine, bromine, iodine), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, and containing a hetero atom, for example, a nitrogen atom, an oxygen atom or a sulfur atom, e.g., imidazolyl, pyridyl, quinolyl, furyl, thienyl, piperidyl, morpholiho, benzoxazolyl, benzimidazolyl, benzothiazolyl, carbazolyl, azepinyl) and a silyl group (preferably having from 3 to 40 carbon atoms, more preferably from 3 to 30 carbon atoms, still more preferably from 3 to 24 carbon atoms, e.g., trimethylsilyl, triphenylsilyl). These substituents each may be further substituted. When two or more substituents are present, these may be the same or different and if possible, these substituents may combine with each other to form a ring. Also, a plurality of betaine structures may be contained through $R_1$, $R_2$, $R_3$ or L.

In the compound represented by formula (2) for use in the present invention, at least one of $R_1$ to $R_3$ and L preferably contains a group having 8 or more carbon atoms. In particular, $R_1$, $R_2$ or $R_3$ preferably contains a long-chain alkyl group.

(3)

wherein R, L, q, r and p have the same meanings as in formula (1), $M^1$ represents an alkali metal ion or a hydrogen atom, provided that p+r is 3, and when p is 2 or more, Rs may be the same or different.

Formulae (1) and (3) are described in more detail below.

In the formulae, R represents an alkyl group (which may be substituted; preferably an alkyl group having from 1 to 20 carbon atoms, e.g., methyl, ethyl, propyl, butyl, hexyl, octyl, dodecyl, cetyl, stearyl, oleyl), an aryl group (which may be substituted; preferably an aryl group having from 6 to 20 carbon atoms, e.g., phenyl, tolyl, xylyl, naphthyl, cumyl, dodecylphenyl) or a heterocyclic group (which may be substituted; preferably a heterocyclic group having from 2 to 20 carbon atoms, e.g., pyridyl, quinolyl) and Rs may combine with each other to form a cyclic structure. R is preferably an alkyl group.

L represents a divalent or greater valent linking group. L is preferably a divalent or higher valent linking group containing an alkylene group, an arylene group or the like as a fundamental constituent unit. In the linking main chain part, a heteroatom such as oxygen atom, sulfur atom and nitrogen atom may be contained.

R and L each may be substituted by various substituents. Examples of the substituent include an alkyl group (preferably having from 1 to 20 carbon atoms, more preferably from 1 to 12 carbon atoms, still more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20 carbon atoms, more preferably from 2 to 12 carbon atoms, still more preferably from 2 to 8 carbon atoms, e.g., vinyl, allyl, 2-butenyl, 3-pentenyl), an alkynyl group (preferably having from 2 to 20 carbon atoms, more preferably from 2 to 12 carbon atoms, still more preferably from 2 to 8 carbon atoms, e.g., propargyl, 3-pentynyl), an aryl group (preferably having from 6 to 30 carbon atoms, more preferably from 6 to 20 carbon atoms, still more preferably from 6 to 12 carbon atoms, e.g., phenyl, p-methylphenyl, naphthyl), an amino group (preferably having from 0 to 20 carbon atoms, more preferably from 0 to 12 carbon atoms, still more preferably from 0 to 6 carbon atoms, e.g., amino, methylamino, dimethylamino, diethylamino, diphenylamino, dibenzylamino), an alkoxy group (preferably having from 1 to 20 carbon atoms, more preferably from 1 to 12 carbon atoms, still more preferably from 1 to 8 carbon atoms, e.g., methoxy, ethoxy, butoxy), an aryloxy group (preferably having from 6 to 20 carbon atoms, more preferably from 6 to 16 carbon atoms, still more preferably from 6 to 12 carbon atoms, e.g., phenyloxy, 2-naphthyloxy), an acyl group (preferably having from 1 to 20 carbon atoms, more preferably from 1 to 16 carbon atoms, still more preferably from 1 to 12 carbon atoms, e.g., acetyl, benzoyl, formyl, pivaloyl), an alkoxycarbonyl group (preferably having from 2 to 20 carbon atoms, more preferably from 2 to 16 carbon atoms, still more preferably from 2 to 12 carbon atoms, e.g., methoxycarbonyl, ethoxycarbonyl), an aryloxycarbonyl group (preferably having from 7 to 20 carbon atoms, more preferably from 7 to 16 carbon atoms, still more preferably from 7 to 10 carbon atoms, e.g., phenyloxycarbonyl), an acyloxy group (preferably having from 2 to 20 carbon atoms, more preferably from 2 to 16 carbon atoms, still more preferably from 2 to 10 carbon atoms, e.g., acetoxy, benzoyloxy); an acylamino group (preferably having from 2 to 20 carbon atoms; more preferably from 2 to 16 carbon atoms, still more preferably from 2 to 10 carbon atoms, e.g., acetylamino, benzoylamino), an alkoxycarbonylamino group (preferably having from 2 to 20 carbon atoms, more preferably from 2 to 16 carbon atoms, still more preferably from 2 to 12 carbon atoms, e.g., methoxycarbonylamino), an aryloxycarbonylamino group (preferably having from 7 to 20 carbon atoms, more preferably from 7 to 16 carbon atoms, still more preferably from 7 to 12 carbon atoms, e.g., phenyloxycarbonylamino), a sulfonylamino group (preferably having from 1 to 20 carbon atoms, more preferably from 1 to 16 carbon atoms, still more preferably from 1 to 12 carbon atoms, e.g., methanesulfonylamino, benzenesulfonylamino), a sulfamoyl group (preferably having from 0 to 20 carbon atoms, more preferably from 0 to 16 carbon atoms, still more preferably from 0 to 12 carbon atoms, e.g., sulfamoyl, methylsulfamoyl, dimethylsulfamoyl, phenylsulfamoyl), a carbamoyl group (preferably having from 1 to 20 carbon atoms, more preferably from 1 to 16 carbon atoms, still more preferably from 1 to 12 carbon atoms, e.g., carbamoyl, methylcarbamoyl, diethylcarbamoyl, phenylcarbamoyl), an alkylthio group (preferably having from 1 to 20 carbon atoms, more preferably from 1 to 16 carbon atoms, still more preferably from 1 to 12 carbon atoms, e.g., methylthio, ethylthio), an arylthio group (preferably having from 6 to 20 carbon atoms, more preferably from 6 to 16 carbon atoms, still more preferably from 6 to 12 carbon atoms, e.g., phenylthio), a sulfonyl group (preferably having from 1 to 20 carbon atoms, more preferably from 1 to 16 carbon atoms, still more preferably from 1 to 12 carbon atoms, e.g., mesyl, tosyl), a sulfinyl group (preferably having from 1 to 20 carbon atoms, more preferably from 1 to 16 carbon atoms, still more preferably from 1 to 12 carbon atoms, e.g., methanesulfinyl, benzenesulfinyl), a ureido group (preferably having from 1 to 20 carbon atoms, more preferably from 1 to 16 carbon atoms, still more preferably from 1 to 12 carbon atoms, e.g., ureido, methylureido, phenylureido), a phosphoric acid amido group (preferably having from 1 to 20 carbon atoms, more preferably from 1 to 16 carbon atoms, still more preferably from 1 to 12 carbon atoms, e.g., diethylphosphoric acid amido, phenylphosphoric acid amido), a hydroxy group, a mercapto group, a halogen atom (e.g., fluorine, chlorine, bromine, iodine), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, and containing a heteroatom, for example, a nitrogen atom, an oxygen atom or a sulfur atom; e.g., imidazolyl, pyridyl, quinolyl, furyl, thienyl, piperidyl, morpholino, benzoxazolyl, benzimidazolyl, benzothiazolyl, carbazolyl, azepinyl) and a silyl group (preferably having from 3 to 40 carbon atoms, more preferably from 3 to 30 carbon atoms, still more preferably from 3 to 24 carbon atoms, e.g., trimethylsilyl, triphenylsilyl). These substituents each may be further substituted. When two or more substituents are present, these may be the same or different and if possible, these substituents may combine with each other to form a ring. Also, a plurality of betaine structures may be contained through R or L.

M represents a hydrogen atom, an alkali metal cation (e.g., sodium ion, potassium ion, lithium ion, cesium ion), an ammonium ion or an aminic organic cation (in the case of a primary, secondary or tertiary amine, it is a protonated amine, for example, protonated methylamine, dimethylamine, ethylamine, diethylamine, triethylamine, diazabicycloundecene, diazabicyclooctane, piperidine, pyrrolidine, morpholine, N-methylpiperidine, N-methyl morpholine, pyridine, pyrazine, aniline or N,N-dimethylaniline; in the case of a quaternary ammonium salt, it is, for example, tetramethylammonium ion, tetraethylammonium ion, trimethylbenzylammonium ion, methylpyridinium ion or benzylpyridinium ion). M is preferably an alkali metal ion or a hydrogen atom.

q represents an integer of 1 or more (preferably 5 or less, more preferably 2 or less), r represents an integer of 1 to 4 (preferably 1 or 2) p represents an integer of 0 to 4 (preferably 1 or 2), and p+r is 3 or 4. When p+r is 4, the N atom forms a quaternary ammonium cation and one of Ms becomes an anion in the dissociated state. When q is 2 or more, COOMs may be the same or different. When r is 2 or more L—(COOM)$_q$s may be the same or different. When p is 2 or more, Rs may be the same or different.

Furthermore, R or L preferably contains a hydrocarbon group having 8 or more carbon atoms. Among the compounds represented by formula (3), most preferred is a compound represented by the following formula (4):

R—N—(L—COOM)$_2$     (4)

wherein R and L have the same meanings as above and two (L—COOM)s may be the same or different (two Ls or two Ms may be the same or different). R is preferably an alkyl group and L is preferably ah alkylene group.

Preferred examples of the betaine compound are set forth below, however, the present invention is not limited thereto.

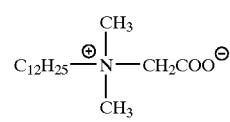

X1-1

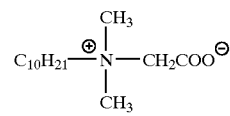

X1-2

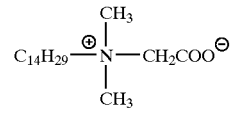

X1-3

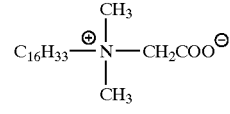

X1-4

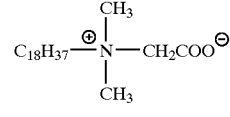

X1-5

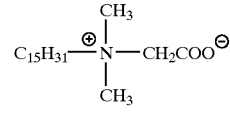

X1-6

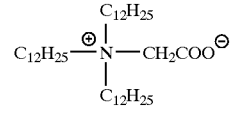

X1-7

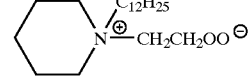

X1-8

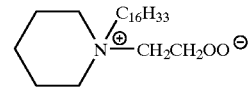

X1-9

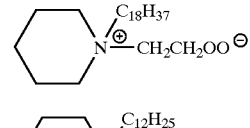

X1-10

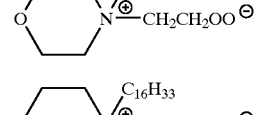

X1-11

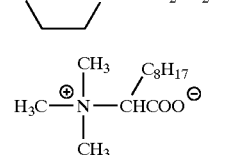

X1-12

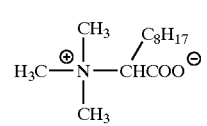

X1-13

X1-14 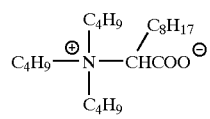
X1-15 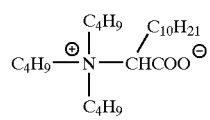
X1-16 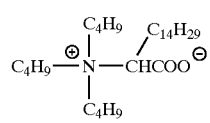
X1-17 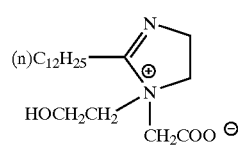
X1-18 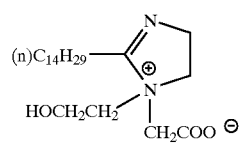
X1-19 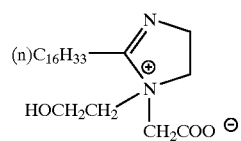
X1-20 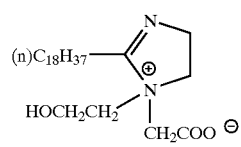
X1-21 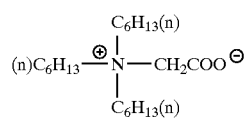
X1-22 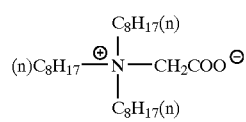
X1-23 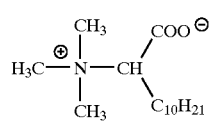
X1-24 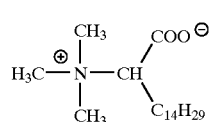
X1-25 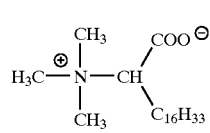
X1-26 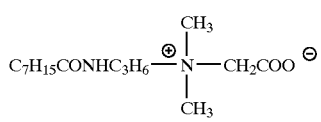
X1-27 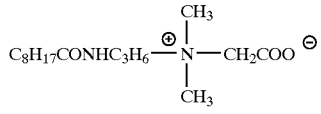
X1-28 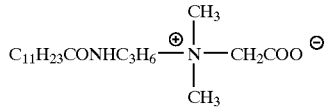
X1-29 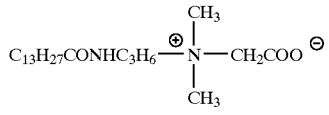
X1-30 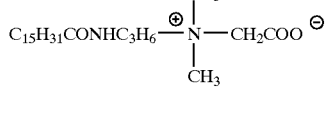
X1-31 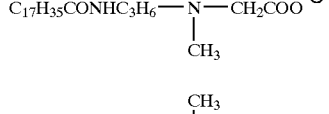
X1-32 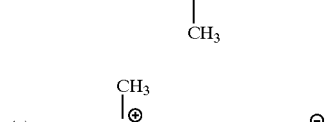
X1-33 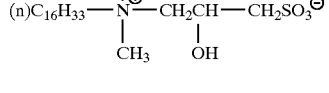
X1-34 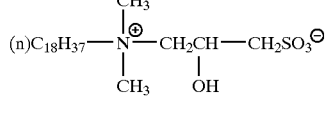
X2-1 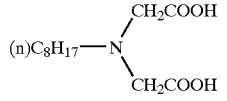
X2-2 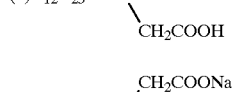
X2-3 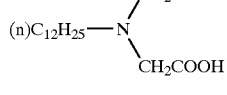
X2-4 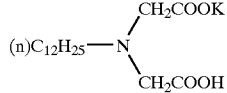

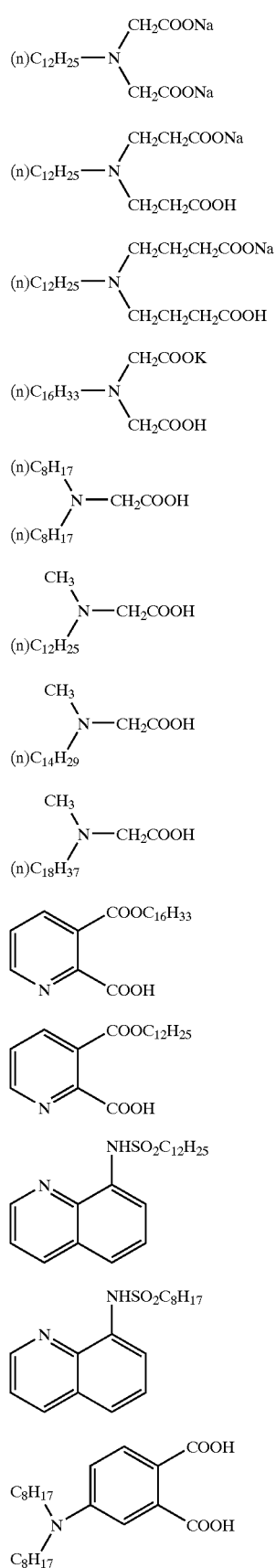
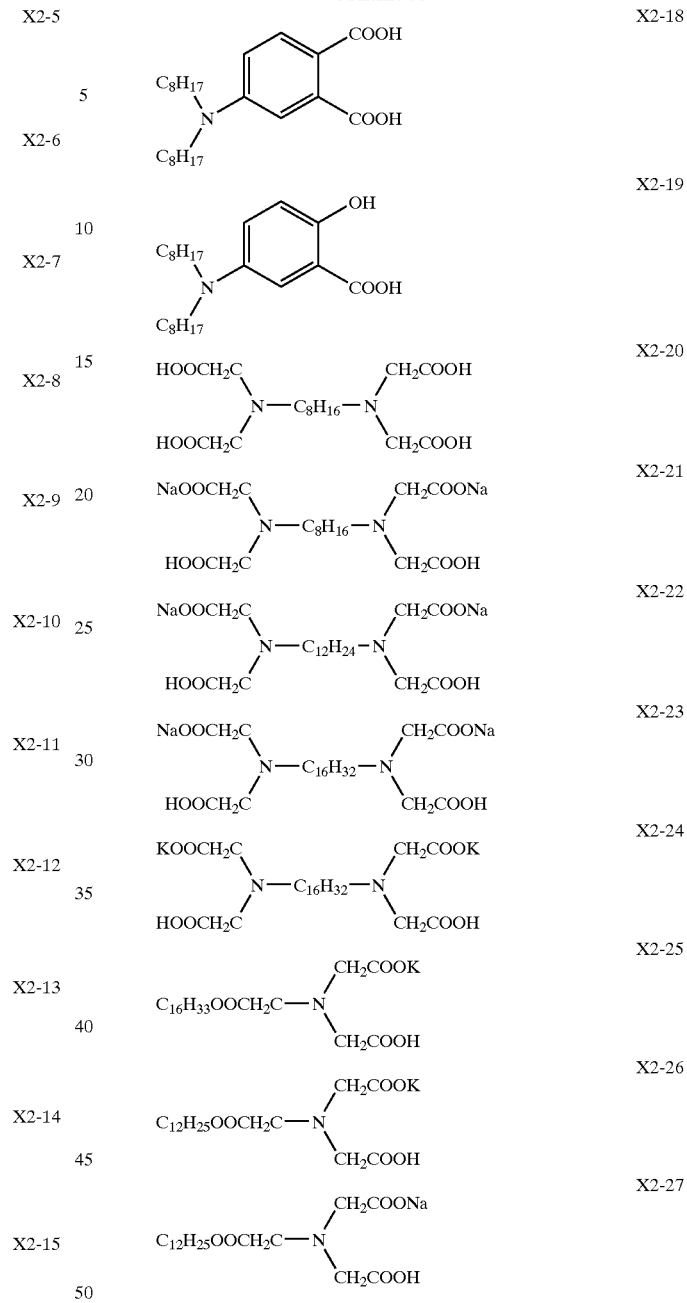

The betaine compound may be added in any amount as long as the effect of the present invention is provided, however, the amount of the betaine compound added is preferably from 0.001 to 50 wt %, more preferably from 0.01 to 20 wt %, in the ink composition. In the ink set comprising at least two inks having the same color hue but different dye concentration, the concentration of the betaine compound in an ink having a highest dye concentration must be higher than that in an ink having a lowest dye concentration. The concentration of the betaine compound preferably increases with increase in the concentration of the dye contained in the ink among the ink set. That is, it is preferred that as the dye concentration is higher, the betaine compound content is higher in the ink constituting the ink set Assuming that the dye concentrations of two inks A and B are Da and Db (Da>Db), respectively, and the betaine compound concentrations are Va and Vb (Va>Vb), respectively, k in Da/Db=k(Va/Vb) is preferably from 0.1 to 10.

The ink for use in the ink set of the present invention is an ink obtained by dissolving or dispersing a dye in water and a water-soluble organic solvent. An aqueous solution-type ink using a water-soluble dye is particularly preferred. In the ink set, the ink containing the betaine compound may have any color.

When the betaine compound according to the present invention is used, bubbles may be sometimes generated in the ink. Such bubbles give rise to the printing defect at the inkjet recording. Such a problem can be overcome by adding a compound having an action of eliminating bubbles (defoaming agent) to the ink.

Various defoaming agents such as pluronic defoaming agent (polyoxyethylene-polyoxypropylene type defoaming agent) and silicone-type defoaming agent can be used.

As the water-soluble dye, dyes such as magenta dyes described in JP-A-2002-371214 (the term "JP-A" as used herein means an "unexamined published Japanese patent application"), phthalocyanine dyes described in JP-A-2002-309118, and water-soluble phthalocyanine dyes described in JP-A-2003-12952 and JP-A-2003-12956 are preferably used. Furthermore, the following yellow dyes and black dyes are also preferred.

The yellow dye useful for the present invention is described in detail below.

A reflection density after printing an ink on a reflective medium is measured through a Status A filter (for example, X-rite 310TR Densitometer) and one point having a reflection density ($D_B$) of 0.90 to 1.10 in the yellow region is defined as the initial density of the ink. Then, the printed matter is enforcedly discolored by using an ozone discoloration tester capable of always generating 5 ppm of ozone and an accelerated fading rate constant (k) is determined according to $(0.8=e^{-kt})$ from the time period (t) until the reflection density decreases to 80% of the initial density. The yellow dye used in one ink (composition) for use in the inkjet recording method of the present invention is controlled to have the accelerated fading rate constant of $5.0 \times 10^{-2}$ [hour$^{-1}$] or less, preferably $3.0 \times 10^{-2}$ [hour$^{-1}$] or less, more preferably $1.0 \times 10^{-2}$ [hour$^{-1}$] or less, in view of fastness and ozone gas resistance.

Also, the yellow dye is preferably a dye having an oxidation potential more positive than 1.0 V (vs SCE), more preferably more positive than 1.1 V (vs SCE), and most preferably more positive than 1.15 V (vs SCE). As for the type of the dye, an azo dye satisfying the above-described requirements is particularly preferred.

The oxidation potential value (Eox) can be easily measured by one skilled in the art and the method therefor is described, for example, in P. Delahay, *New Instrumental Methods in Electrochemistry*, Interscience Publishers (1954), A. J. Bard et al., *Electrochemical Methods*, John Wiley & Sons (1980), and Akira Fujishima et al., *Denkikagaku Sokutei Ho* (*Electrochemical Measuring Methods*), Gihodo Shuppan Co., Ltd. (1984).

More specifically, a test sample is dissolved at a concentration of $1 \times 10^{-2}$ to $1 \times 10^{-6}$ mol/liter in a solvent such as dimethylformamide or acetonitrile containing a supporting electrolyte such as sodium perchlorate or tetrapropylammonium perchlorate and the oxidation potential is measured as a value to SCE (saturated calomel electrode) by using a cyclic voltammetry. The value sometimes deviates on the order of several tens of millivolts due to the effect of liquid junction potential, liquid resistance of sample solution, or the like, but reproducibility of the potential can be guaranteed by calibration using a standard sample (for example, hydroquinone).

In order to univocally specify the potential, in the present invention, a value (vs SCE) measured in a dimethylformamide (concentration of dye: 0.001 mol dm$^{-3}$) containing 0.1 mol dm$^{-3}$ of tetrapropylammonium perchlorate as the supporting electrolyte is used as the oxidation potential of the dye.

The Eox value indicates the transferability of an electron from the sample to the electrode and as the value is larger (the oxidation potential is more positive), the electron is less transferable from the sample to the electrode, in other words, the oxidation less occurs. As for the relationship with the structure of compound, the oxidation potential becomes more positive when an electron-withdrawing group is introduced, and becomes more negative when an electron-donating group is introduced. In the present invention, the oxidation potential is preferably rendered more positive by introducing an electron-withdrawing group into the yellow dye skeleton so as to reduce the reactivity with ozone that is an electrophilic agent.

The dye for use in the present invention preferably has good color hue as well as good fastness, more preferably has a sharp absorption spectrum on the long wave side. For this purpose, the yellow dye preferably has λmax in the region from 390 to 470 nm and a ratio I(λmax+70 nm)/I(λmax) of the absorbance at λmax+70 nm (I(λmax+70 nm)) to the absorbance at λmax (I(λmax)) is preferably 0.2 or less, more preferably 0.1 or less. The lower limit of the ratio is about 0.01. These max are values measured in an aqueous solution of the dye.

The dye satisfying these oxidation potential and absorption properties is preferably a dye represented by the following formula (Y1). However, the compound represented by formula (1) is sufficient if the λmax is in the range from 390 to 470 nm, and the above-described oxidation potential and ratio I(λmax+70 nm)/I(λmax) need not be always satisfied.

A—N=N—B     (Y1)

wherein A and B each independently represents a heterocyclic group which may be substituted.

A heterocyclic ring for the heterocyclic group is preferably a heterocyclic ring constituted by a 5- or 6-membered ring and the heterocyclic ring may have a monocyclic structure or a polycyclic structure resulting from condensation of two or more rings and may be an aromatic heterocyclic ring or a non-aromatic heterocyclic ring. A hetero atom constituting the heterocyclic ring is preferably N, O or S atom.

The heterocyclic ring represented by A in formula (Y1) is preferably 5-pyrazolone, pyrazole, triazole, oxazolone, isoxazolone, barbituric acid, pyridone, pyridine, rhodanine, pyrazolidinedione, pyrazolopyridone, merdramic acid or a condensed heterocyclic ring resulting from condensation of such a heterocyclic ring with a hydrocarbon aromatic ring or a heterocyclic ring, more preferably 5-pyrazolone, 5-aminopyrazole, pyridone, 2,6-diaminopyridine or a pyrazoloazole, still more preferably 5-aminopyrazole, 2-hydroxy-6-pyridone or pyrazolotriazole.

Examples of the heterocyclic ring represented by B include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, isoxazole, benzoxazole, thiazole, benzothiazole, isothiazole, benzisothiazole, thiadiazole, benzisoxazole, pyrrolidine, piperidine, piperazine, imidazolidine and thiazoline. Among these, preferred are pyridine, quinoline, thiophene, benzothiophene, pyrazole, imidazole, benzimidazole, triazole, oxazole, isoxazole, benzoxazole, thiazole, benzothiazole, isothiazole, benzisothiazole, thiadiazole and benzisoxazole, more preferred are quinoline, thiophene, pyrazole, thiazole, benzoxazole, benzisoxazole, isothiazole, imidazole, benzothiazole and thiadiazole, and still more preferred are pyrazole, benzothiazole, benzoxazole, imidazole, 1,2,4-thiadiazole and 1,3,4-thiadiazole.

Examples of the substituent substituted on A or B include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an imido group, a phosphino group, a phosphinyl group, a phosphinyloxy group, a phosphinylamino group, a silyl group and an ionic hydrophilic group.

In the case where the dye represented by formula (Y1) is used as a water-soluble dye, the dye preferably contains at least one ionic hydrophilic group in the molecule thereof. Examples of the ionic hydrophilic group include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetraethylphosphonium). Among the counter ions, alkali metal salts are preferred.

Among the dyes represented by formula (Y1), preferred are dyes represented by formulae (Y2), (Y3) and (Y4):

Formula (Y2):

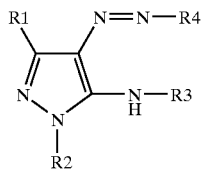

wherein R1 and R3 each represent a hydrogen atom, a cyano group, an alkyl group, a cycloalkyl group, an aralkyl group, an alkoxy group, an alkylthio group, an arylthio group, an aryl group or an ionic hydrophilic group, R2 represents a hydrogen atom, an alkyl group, a cycloalkyl group, an aralkyl group, a carbamoyl group, an acyl group, an aryl group or a heterocyclic group, and R4 represents a heterocyclic group;

Formula (Y3):

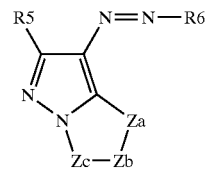

wherein R5 represents a hydrogen atom, a cyano group, an alkyl group, a cycloalkyl group, an aralkyl group, an alkoxy group, an alkylthio group, an arylthio group, an aryl group or an ionic hydrophilic group, Za represents —N═, —NH— or —C(R11)═, Zb and Zc each independently represent —N═ or —C(R11)═, R11 represents a hydrogen atom or a nonmetallic substituent, and R6 represents a heterocyclic group;

Formula (Y4):

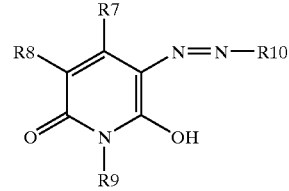

wherein R7 and R9 each independently represents a hydrogen atom, a cyano group, an alkyl group, a cycloalkyl group, an aralkyl group, an aryl group, an alkylthio group, an arylthio group; an alkoxycarbonyl group, a carbamoyl group or an ionic hydrophilic group, R8 represents a hydrogen atom, a halogen atom, an alkyl group, an alkoxy group, an aryl group, an aryloxy group, a cyano group, an acylamino group, a sulfonylamino group, an alkoxycarbonylamino group, a ureido group, an alkylthio group, an arylthio group, an alkoxycarbonyl group, a carbamoyl group, a sulfamoyl group, an alkylsulfonyl group, an arylsulfonyl group, an acyl group, an amino group, a hydroxy group or an ionic hydrophilic group, and R10 represents a heterocyclic group.

The alkyl group represented by R1, R2, R3, R5, R7, R8 and R9 in formulae (Y2), (Y3) and (Y4) includes an alkyl group having a substituent and an unsubstituted alkyl group. The alkyl group is preferably an alkyl group having from 1 to 20 carbon atoms. Examples of the substituent include a hydroxyl group, an alkoxy group, a cyano group, a halogen atom and an ionic hydrophilic group. Examples of the alkyl group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group and a 4-sulfobutyl group.

The cycloalkyl group represented by R1, R2, R3, R5, R7, R8 and R9 includes a cycloalkyl group having a substituent and an unsubstituted cycloalkyl group. The cycloalkyl group is preferably a cycloalkyl group having from 5 to 12 carbon atoms. Examples of the substituent include an ionic hydrophilic group. Examples of the cycloalkyl group include a cyclohexyl group.

The aralkyl group represented by R1, R2, R3, R5, R7, R8 and R9 include an aralkyl group having a substituent and an unsubstituted aralkyl group. The aralkyl group is preferably an aralkyl group having from 7 to 20 carbon atoms. Examples of the substituent include an ionic hydrophilic group. Examples of the aralkyl group include a benzyl group and a 2-phenethyl group.

The aryl group represented by R1, R2, R3, R5, R7, R8 and R9 includes an aryl group having a substituent and an unsubstituted aryl group. The aryl group is preferably an aryl group having from 6 to 20 carbon atoms. Examples of the substituent include an alkyl group, an alkoxy group, a halogen atom, an alkylamino group and an ionic hydrophilic group. Examples of the aryl group include a phenyl group, a p-tolyl group, a p-methoxyphenyl group, an o-chlorophenyl group and an m-(3-sulfopropylamino) phenyl group.

The alkylthio group represented by R1, R2, R3, R5, R7, R8 and R9 includes an alkylthio group having a substituent and an unsubstituted alkylthio group. The alkylthio group is preferably an alkylthio group having from 1 to 20 carbon atoms. Examples of the substituent include an ionic hydrophilic group. Examples of the alkylthio group include a methylthio group and an ethylthio group.

The arylthio group represented by R1, R2, R3, R5, R7, R8 and R9 includes an arylthio group having a substituent and an unsubstituted arylthio group. The arylthio group is preferably an arylthio group having from 6 to 20 carbon atoms. Examples of the substituent include an alkyl group and an ionic hydrophilic group. Examples of the arylthio group include a phenylthio group and a p-tolylthio group.

The heterocyclic group represented by R2 and $R^{22}$ which is described later is preferably a 5- or 6-membered heterocyclic ring and the heterocyclic ring may be further condensed. The heteroatom constituting the heterocyclic ring is preferably N, S or O. The ring may be an aromatic heterocyclic ring or a non-aromatic heterocyclic ring. The heterocyclic ring may be substituted and examples of the substituent are the same as those of the substituent of the aryl group which is described later. The heterocyclic ring is preferably a 6-membered nitrogen-containing aromatic heterocyclic ring and preferred examples thereof include triazine, pyrimidine and phthalazine.

The halogen atom represented by R8 includes a fluorine atom, a chlorine atom and a bromine atom.

The alkoxy group represented by R1, R3, R5 and R8 includes an alkoxy group having a substituent and an unsubstituted alkoxy group. The alkoxy group is preferably an alkoxy group having from 1 to 20 carbon atoms. Examples of the substituent include a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group represented by R8 includes an aryloxy group having a substituent and an unsubstituted aryloxy group. The aryloxy group is preferably an aryloxy group having from 6 to 20 carbon atoms. Examples of the substituent include an alkoxy group and an ionic hydrophilic group. Examples of the aryloxy group include a phenoxy group, a p-methoxyphenoxy group and an o-methoxyphenoxy group. The acylamino group represented by R8 includes an acylamino group having a substituent and an unsubstituted acylamino group. The acylamino group is preferably an acylamino group having from 2 to 20 carbon atoms. Examples of the substituent include an ionic hydrophilic group. Examples of the acylamino group include an acetamide group, a propionamide group, a benzamide group and a 3,5-disulfobenzamide group.

The sulfonylamino group represented by R8 includes a sulfonylamino group having a substituent and an unsubstituted sulfonylamino group. The sulfonylamino group is preferably a sulfonylamino group having from 1 to 20 carbon atoms. Examples of the sulfonylamino group include a methylsulfonylamino group and an ethylsulfonylamino group.

The alkoxycarbonylamino group represented by R8 includes an alkoxycarbonylamino group having a substituent and an unsubstituted alkoxycarbonylamino group. The alkoxycarbonylamino group is preferably an alkoxycarbonylamino group having from 2 to 20 carbon atoms. Examples of the substituent include an ionic hydrophilic group. Examples of the alkoxycarbonylamino group include an ethoxycarbonylamino group.

The ureido group represented by R8 includes a ureido group having a substituent and an unsubstituted ureido group. The ureido group is preferably a ureido group having from 1 to 20 carbon atoms. Examples of the substituent include an alkyl group and an aryl group. Examples of the ureido group include a 3-methylureido group, a 3,3-dimethylureido group and a 3-phenylureido group.

The alkoxycarbonyl group represented by R7, R8 and R9 includes an alkoxycarbonyl group having a substituent and an unsubstituted alkoxycarbonyl group. The alkoxycarbonyl group is preferably an alkoxycarbonyl group having from 2 to 20 carbon atoms. Examples of the substituent include an ionic hydrophilic group. Examples of the alkoxycarbonyl group include a methoxycarbonyl group and an ethoxycarbonyl group.

The carbamoyl group represented by R2, R7, R8 and R9 includes a carbamoyl group having a substituent and an unsubstituted carbamoyl group. Examples of the substituent include an alkyl group. Examples of the carbamoyl group include a methylcarbamoyl group and a dimethylcarbamoyl group.

The sulfamoyl group represented by R8 includes a sulfamoyl group having a substituent and an unsubstituted sulfamoyl group. Examples of the substituent include an alkyl group. Examples of the sulfamoyl group include a dimethylsulfamoyl group and a di-(2-hydroxyethyl) sulfamoyl group.

Examples of the alkylsulfonyl group and arylsulfonyl group represented by R8 include a methylsulfonyl group and a phenylsulfonyl group.

The acyl group represented by R2 and R8 includes an acyl group having a substituent and an unsubstituted acyl group. The acyl group is preferably an acyl group having from 1 to 20 carbon atoms. Examples of the substituent include an ionic hydrophilic group. Examples of the acyl group include an acetyl group and a benzoyl group.

The amino group represented by R8 includes an amino group having a substituent and an unsubstituted amino group Examples of the substituent include an alkyl group, an aryl group and a heterocyclic group. Examples of the amino group include a methylamino group, a diethylamino group, an anilino group and a 2-chloroanilino group.

The heterocyclic group represented by R4, R6 and R10 is the same as the heterocyclic group represented by B in formula (Y1), which may be substituted, and preferred examples, more preferred examples and still more preferred examples are the same as those described above. Examples of the substituent include an ionic hydrophilic group, an alkyl group having from 1 to 12 carbon atoms, an aryl group, an alkylthio group, an arylthio group, a halogen atom, a cyano group, a sulfamoyl group, a sulfonamino group, a carbamoyl group and an acylamino group. The alkyl group, the aryl group and the like each may further have a substituent.

In formula (Y3), Za represents —N═, —NH— or —C(R11)═, Zb and Zc each independently represent —N═ or —C(R11)═, and R11 represents a hydrogen atom or a nonmetallic substituent. The nonmetallic substituent represented by R11 is preferably a cyano group, a cycloalkyl group, an aralkyl group, an aryl group, an alkylthio group, an arylthio group or an ionic hydrophilic group. These substituents have the same meanings as the substituents represented by R1, respectively, and preferred examples are also the same. Examples of the skeleton of the heterocyclic ring comprising two 5-membered rings, contained in formula (Y3), are shown below.

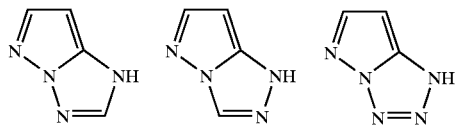

When the above-described substituents each may further have a substituent, examples of the substituent include the substituents which may be substituted on the heterocyclic ring of A or B in formula (Y1).

In the case where the dyes represented by formulae (Y2) to (Y4) are used as a water-soluble dye, the dye preferably contains at least one ionic hydrophilic group in the molecule. In such a case, the dye includes dyes where at least one of R1, R2, R3, R5, R7, R8 and R9 in formulae (Y2) to (Y4) is an ionic hydrophilic group, and dyes where R1 to R11 in formulae (Y2) to (Y4) each further has an ionic hydrophilic group as a substituent.

Among the dyes represented by formulae (Y2), (Y3) and (Y4), preferred are the dyes represented by formula (Y2), and more preferred are the dyes represented by the following formula (Y2-1):

Formula (Y2-1):

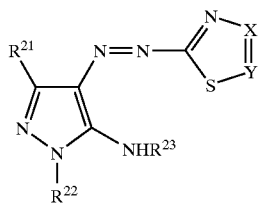

wherein $R^{21}$ and $R^{23}$ each represent a hydrogen atom, an alkyl group, a cycloalkyl group, an aralkyl group, an alkoxy group or an aryl group, $R^{22}$ represents an aryl group or a heterocyclic group, one of X and Y represents a nitrogen atom and the other represents —$CR^{24}$ (wherein $R^{24}$ represents a hydrogen atom, a halogen atom, a cyano group, an alkyl group, an alkylthio group, an alkylsulfonyl group, an alkylsulfinyl group, an alkyloxycarbonyl group, a carbamoyl group, an alkoxy group, an aryl group, an arylthio group, an arylsulfonyl group, an arylsulfinyl group, an aryloxy group or an acylamino group). The substituents each may be further substituted.

Of the dyes in formula (Y2-1), a dye having an ionic hydrophilic group is preferred.

Specific examples of preferred dyes for use in the present invention are set forth below, however, the dye for use in the present invention is not limited to the following specific examples. The compounds can be synthesized by referring to JP-A-2-24191 and JP-A-2001-279145.

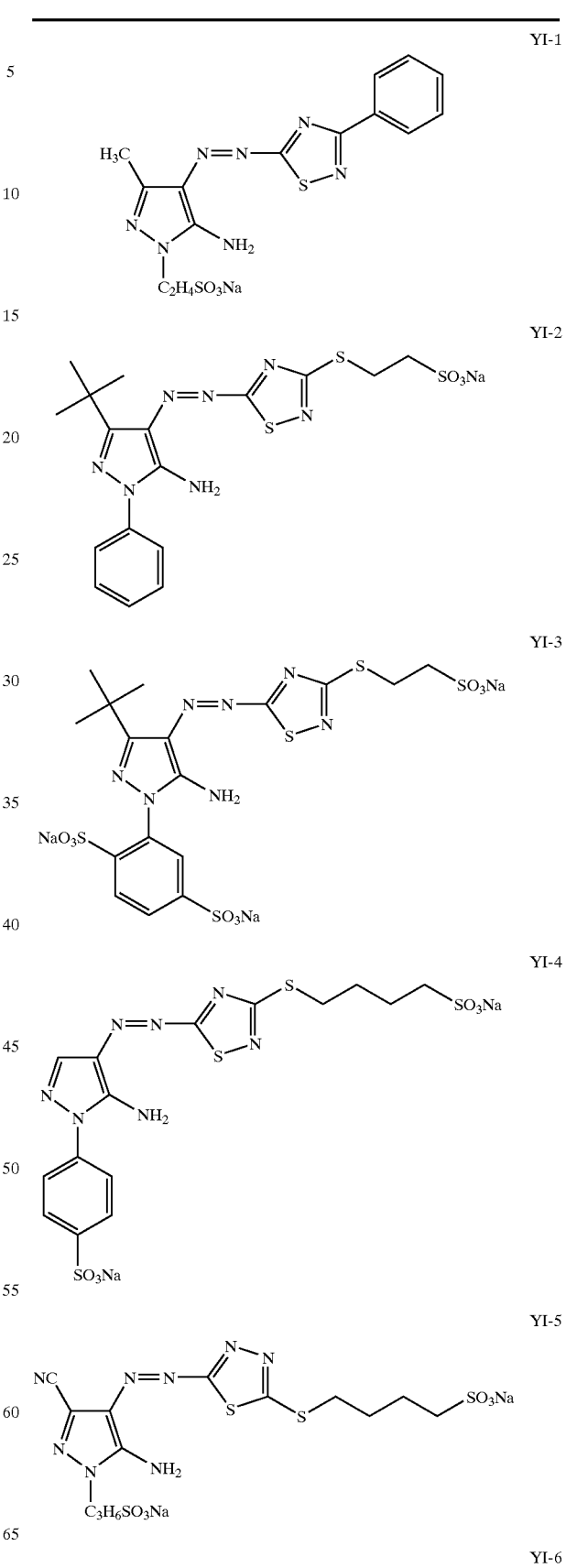

-continued
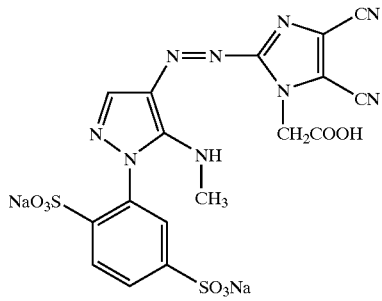
YI-7
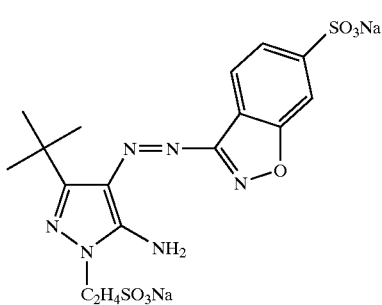
YI-8
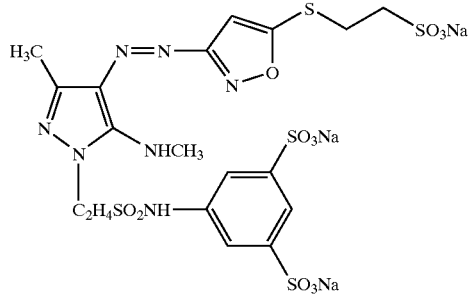
YI-9
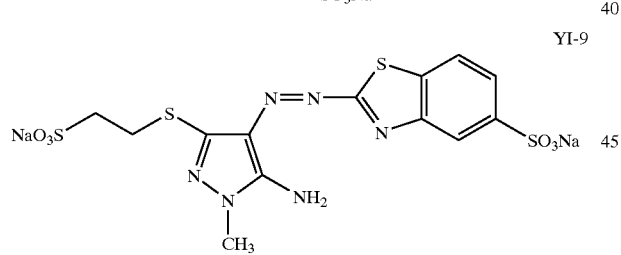
YI-10
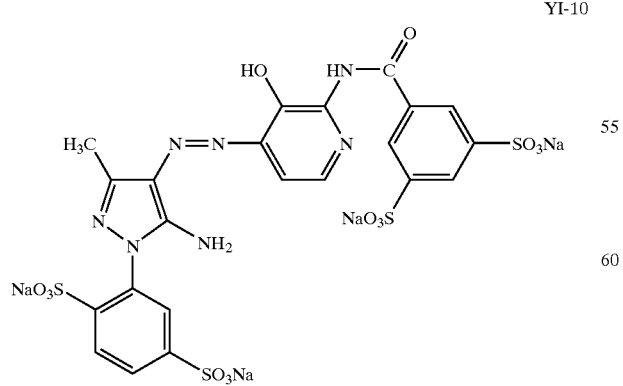
YI-11
-continued
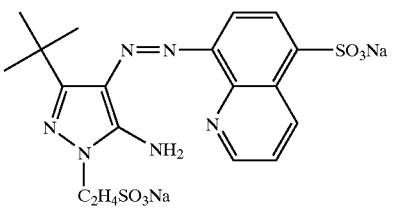
YI-12
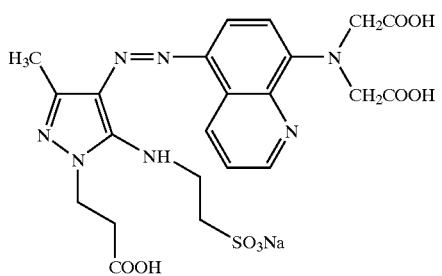
YI-13
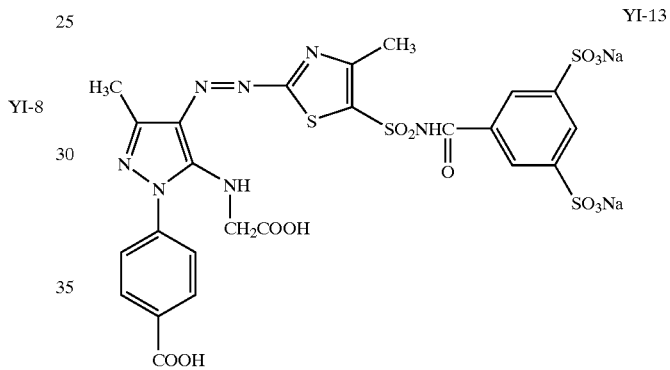
YI-14
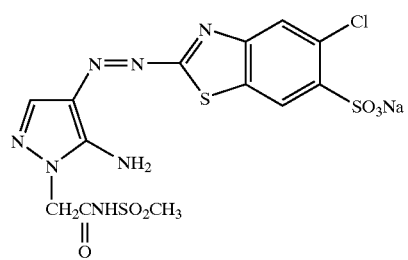
YI-15
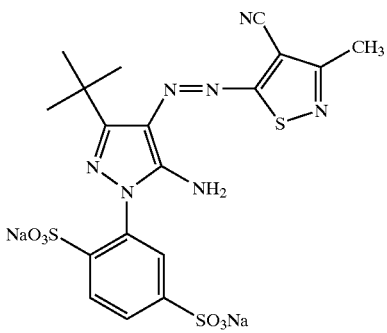
YI-16

-continued
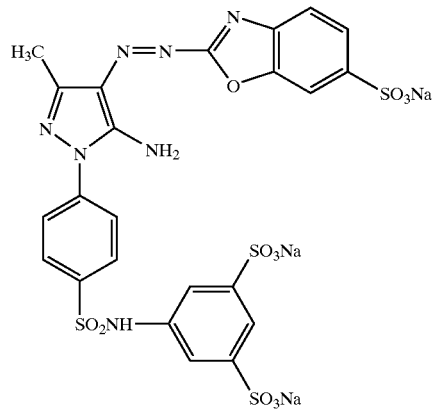
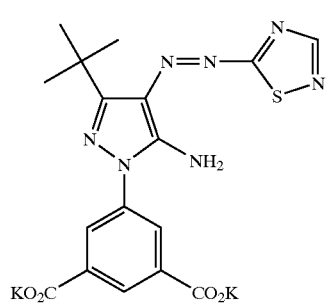
| Dye | R |
|---|---|
| YI-18 | $CH_3$ |
| YI-19 | $C_3H_6SO_3Na$ |
| YI-20 | H |
| YI-21 | $C_2H_4CN$ |
| YI-22 | 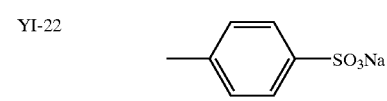 |
| YI-23 | 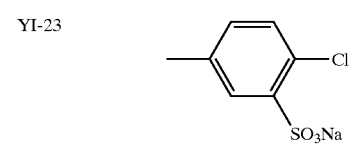 |
| YI-24 | 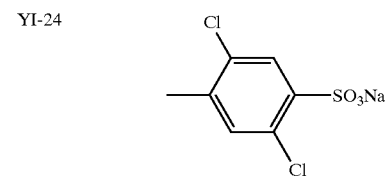 |
| YI-25 | 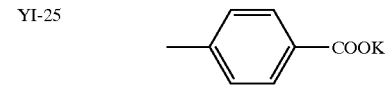 |
YI-26 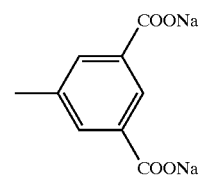
YI-27 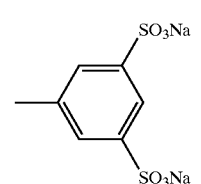
YI-17
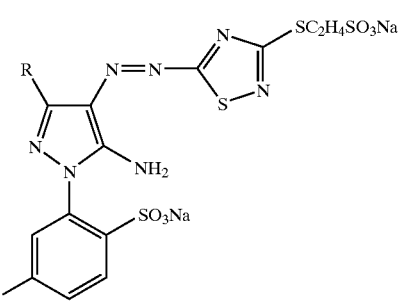
| Dye | R |
|---|---|
| YI-28 | $CH_3$ |
| YI-29 | 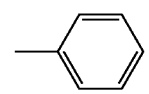 |
| YI-30 | $OC_2H_5$ |
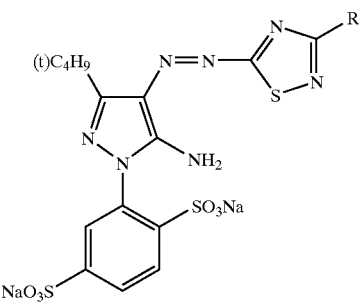
| Dye | R |
|---|---|
| YI-31 | 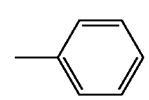 |
| YI-32 | $CH_3$ |
| YI-33 | $SC_2H_4SO_3Na$ |
| YI-34 | $SO_2C_2H_4SO_3Na$ |

-continued

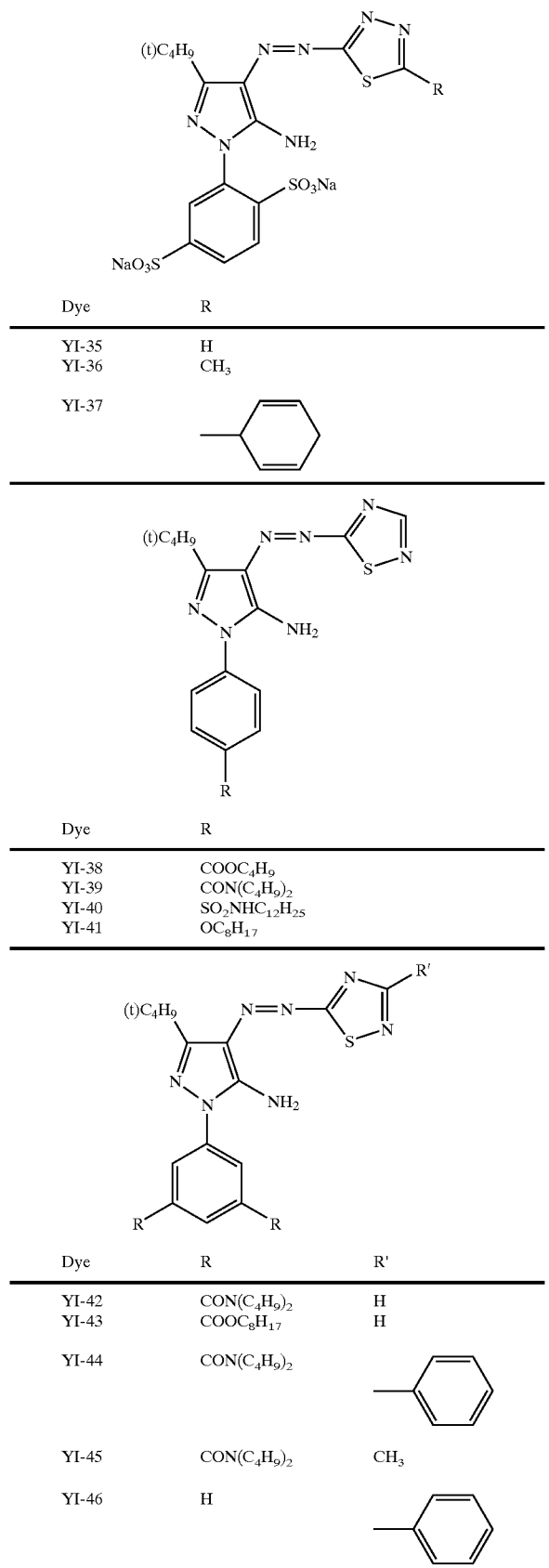

| Dye | R |
|---|---|
| YI-35 | H |
| YI-36 | CH₃ |
| YI-37 | —⟨cyclohexadienyl⟩ |

| Dye | R |
|---|---|
| YI-38 | COOC₄H₉ |
| YI-39 | CON(C₄H₉)₂ |
| YI-40 | SO₂NHC₁₂H₂₅ |
| YI-41 | OC₈H₁₇ |

| Dye | R | R' |
|---|---|---|
| YI-42 | CON(C₄H₉)₂ | H |
| YI-43 | COOC₈H₁₇ | H |
| YI-44 | CON(C₄H₉)₂ | —⟨phenyl⟩ |
| YI-45 | CON(C₄H₉)₂ | CH₃ |
| YI-46 | H | —⟨phenyl⟩ |

-continued

| | | |
|---|---|---|
| YI-47 | H | SC₈H₁₇ |

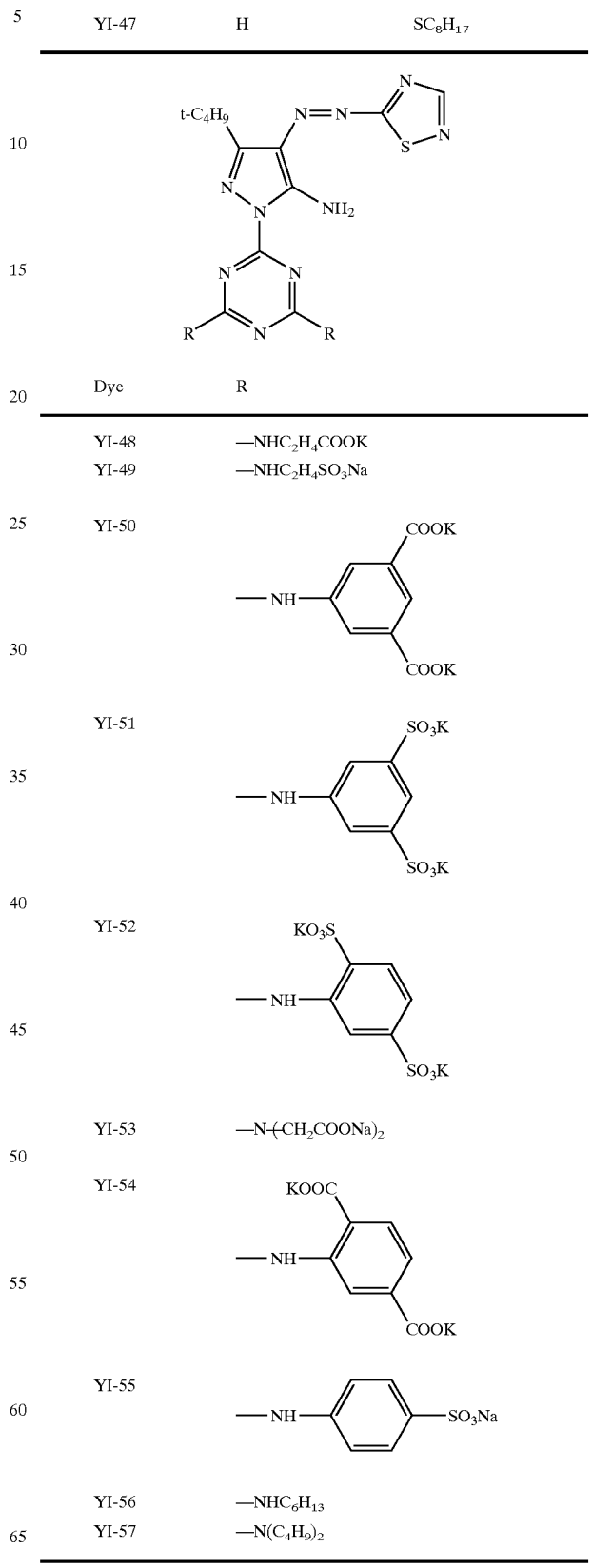

| Dye | R |
|---|---|
| YI-48 | —NHC₂H₄COOK |
| YI-49 | —NHC₂H₄SO₃Na |
| YI-50 | —NH—⟨3,5-di-COOK-phenyl⟩ |
| YI-51 | —NH—⟨3,5-di-SO₃K-phenyl⟩ |
| YI-52 | —NH—⟨2,5-di-SO₃K-phenyl⟩ |
| YI-53 | —N(CH₂COONa)₂ |
| YI-54 | —NH—⟨2,5-di-COOK-phenyl⟩ |
| YI-55 | —NH—⟨4-SO₃Na-phenyl⟩ |
| YI-56 | —NHC₆H₁₃ |
| YI-57 | —N(C₄H₉)₂ |

-continued
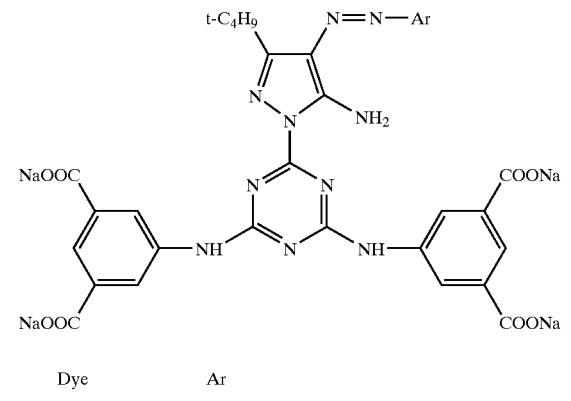
| Dye | Ar |
|---|---|
| YI-58 | 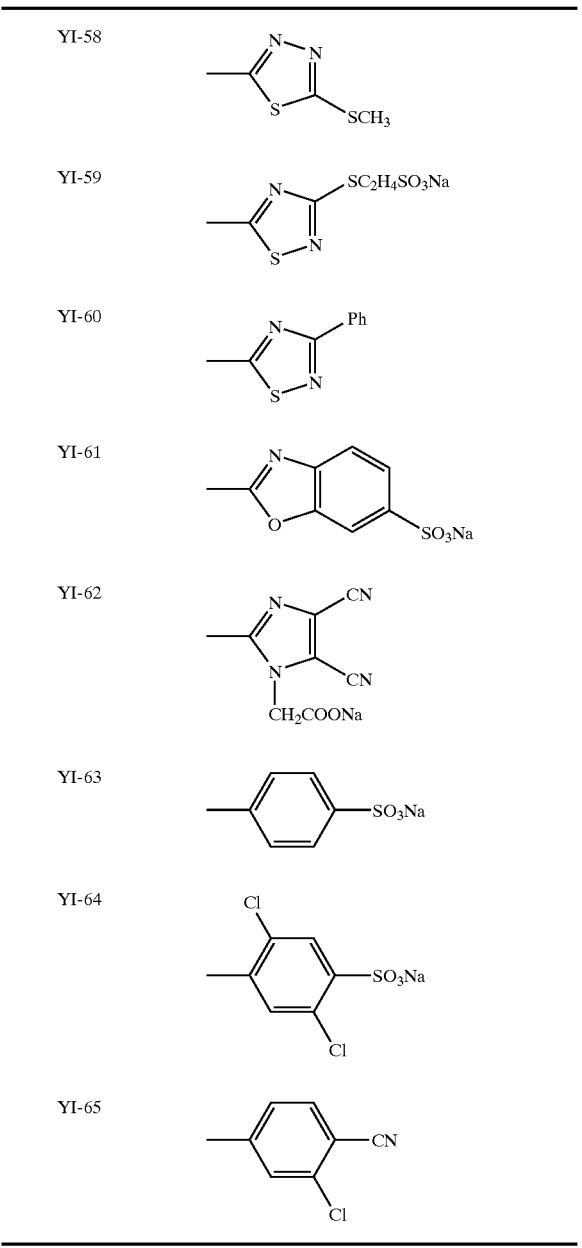 |
| YI-59 | |
| YI-60 | |
| YI-61 | |
| YI-62 | |
| YI-63 | |
| YI-64 | |
| YI-65 | |
-continued
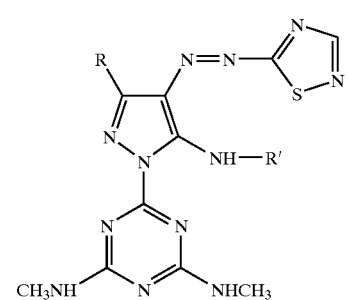
| Dye | R | R' |
|---|---|---|
| YI-66 | Ph | H |
| YI-67 | $OC_2H_5$ | $C_2H_5$ |
| YI-68 | $CH_3$ | H |
| YI-69 | $t\text{-}C_4H_9$ | H |
| YI-70 | $t\text{-}C_4H_9$ | $-C_2H_4COOH$ |
Dye YI-71
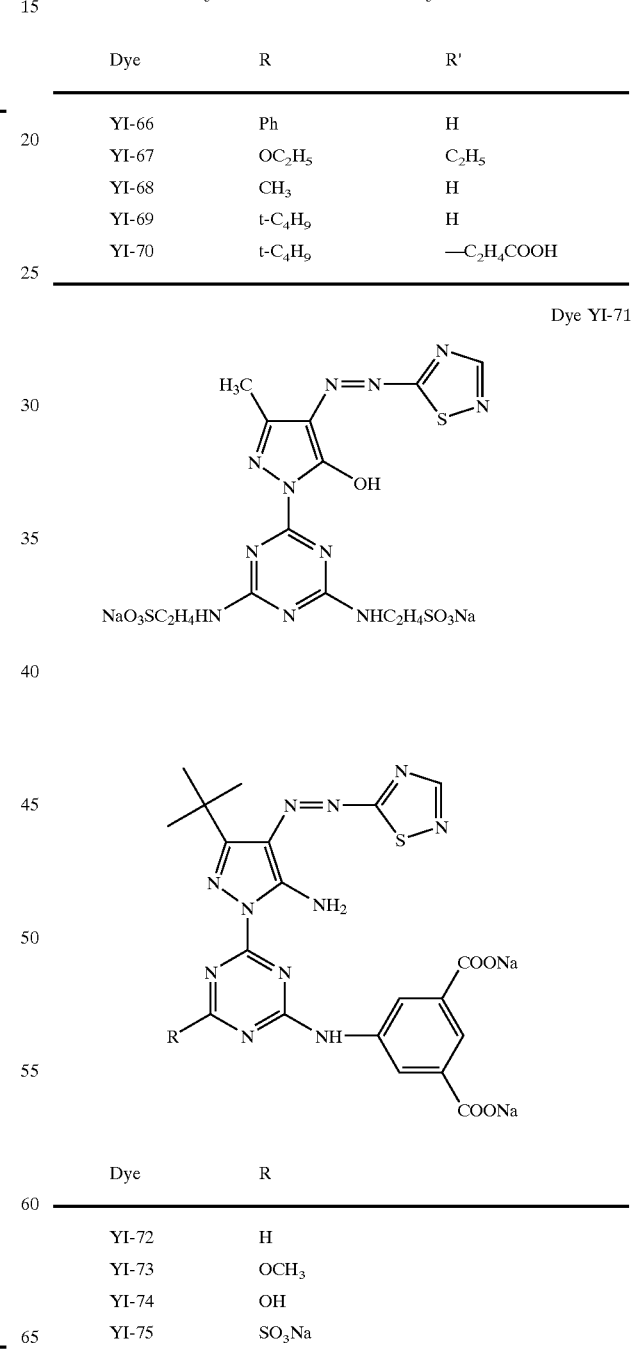
| Dye | R |
|---|---|
| YI-72 | H |
| YI-73 | $OCH_3$ |
| YI-74 | OH |
| YI-75 | $SO_3Na$ |

-continued
| | |
|---|---|
| YI-76 | F |
| YI-77 | 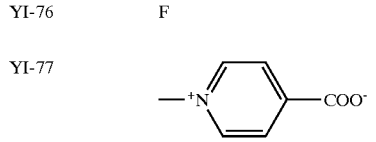 |
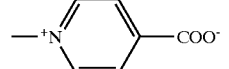
| Dye | R¹ | R² | R³ |
|---|---|---|---|
| YI-78 | Cl | Cl | Cl |
| YI-79 | Cl | Cl | F |
| YI-80 | Cl | —CONHPh | Cl |
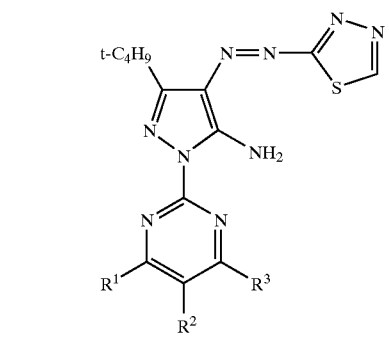
| Dye | R¹ | R² | R³ |
|---|---|---|---|
| YI-81 | F | H | H |
| YI-82 | Cl | H | F |
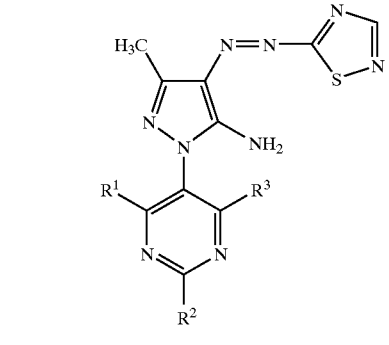
| Dye | R¹ | R² | R³ |
|---|---|---|---|
| YI-83 | H | F | F |
| YI-84 | F | F | H |
-continued
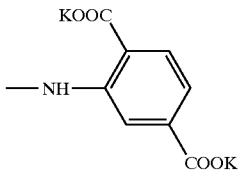
| Dye | R |
|---|---|
| YI-85 | H |
| YI-86 | CH$_3$ |
| YI-87 | Ph |
| YI-88 | SCH$_2$COONa |
| YI-89 | SC$_2$H$_5$ |
| YI-90 | SC$_4$H$_9$-n |
| YI-91 | SCH$_2$CHMe$_2$ |
| YI-92 | SCHMeEt |
| YI-93 | SC$_4$H$_9$-t |
| YI-94 | SC$_7$H$_{15}$-n |
| YI-95 | SC$_2$H$_4$OC$_2$H$_5$ |
| YI-96 | SC$_2$H$_4$OC$_4$H$_9$-n |
| YI-97 | SCH$_2$CF$_3$ |
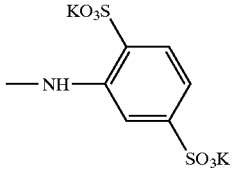
| Dye | R |
|---|---|
| YI-98 | —NHC$_2$H$_4$COOK |
| YI-99 | —NHC$_2$H$_4$SO$_3$Na |
| YI-100 |  |
| YI-101 |  |

-continued

YI-102 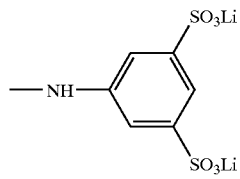

YI-103 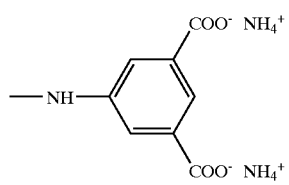

YI-104 —NHC$_6$H$_{13}$-n
YI-105 —N(C$_4$H$_9$-n)$_2$
YI-106 —N-(-CH$_2$COONa)$_2$

YI-107 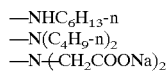

YI-108 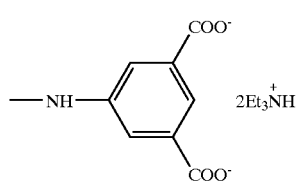

The inkjet recording ink of the present invention preferably contains the yellow dye in an amount of 0.2 to 20 wt %, more preferably from 0.5 to 15 wt %.

The black dye for use in the present invention is described in detail below.

In the black ink for inkjet recording method of the present invention, a dye (L) having λmax in the region from 500 to 700 nm and having a half-value width (Wλ$_{1/2}$) of 100 nm or more (preferably from 120 to 500 nm, more preferably from 120 to 350 nm) in the absorption spectrum of a dilute solution standardized to an absorbance of 1.0 is used.

In the case where the dye (L) by itself can realize black of high image quality "pure black" (that is, black which is not dependent on the light source at the observation and less susceptible to stress of any one color tone of B, G and R), the dye may be used alone as the dye for black ink. However, in general, a dye for covering the region where the dye (L) has low absorption is usually used in combination. A dye (S) having a main absorption in a yellow region is preferably used in combination. The black ink may also be produced by using other dyes in combination.

In the present invention, the above-described dye alone or in combination with other dyes is dissolved or dispersed in an aqueous medium to prepare a black ink and in order to satisfy the performances preferred as the black ink for inkjet recording method, namely, 1) the weather resistance is excellent and/or 2) the balance of black is not disrupted even after color fading, an ink satisfying the following conditions is produced.

A black square symbol of JIS code 2223 is printed in a 48-point size by using the black ink and the reflection density (D$_{vis}$) measured by a Status A filter (visual filter) is defined as the initial density. Examples of the reflection densitometer having mounted thereon a Status A filter include X-Rite Densitometer. In the case of measuring the density of "black", the measured value of D$_{vis}$ is used as the standard observed reflection density. The printed matter is enforcedly discolored by using an ozone discoloration tester capable of always generating 5 ppm of ozone and an accelerated fading rate constant (k$_{vis}$) is determined according the relational formula of $0.8=\exp(-k_{vis} \cdot t)$ from the time period (t) until the reflection density (D$_{vis}$) decreases to 80% of the initial reflection density value.

In the present invention, an ink of giving the accelerated fading rate constant (k$_{vis}$) of $5.0\times10^{-2}$ [hour$^{-1}$] or less, preferably $3.0\times10^{-2}$ [hour$^{-1}$] or less, more preferably $1.0\times10^{-2}$ [hour$^{-1}$] or less, is produced (condition 1).

Also, a black square symbol of JIS code 2223 is printed in a 48-point size by using the black ink and the reflection densities (D$_R$, D$_G$, D$_B$) of three colors of C (cyan), M (magenta) and Y (yellow), which are density values measured by a Status A filter, are defined as the initial densities. The D$_R$, D$_G$ and D$_B$ indicate C reflection density by red filter, M reflection density by green filter and Y reflection density by blue filter, respectively. The printed matter is enforcedly discolored by using an ozone discoloration tester capable of always generating 5 ppm of ozone according to the above-described method and the accelerated fading rate constants (k$_R$, k$_G$, k$_B$) are determined similarly from the time period until the reflection densities (D$_R$, D$_G$, D$_B$) decrease to 80% of respective initial density values. When the ratio (R) of the maximum value to the minimum value in the three accelerated fading rate constants is determined (for example, in the case where k$_R$ is a maximum value and k$_G$ is a minimum value, R=k$_R$/k$_G$), an ink of giving a ratio (R) of 1.2 or less, preferably 1.1 or less, more preferably 1.05 or less, is produced (condition 2).

The "printed matter obtained by printing a black square symbol of JIS code 2223 in a 48-point size" used above is an image printed in a size large enough to cover an aperture of the densitometer and thereby give a sufficiently large size for the measurement of density.

At least one of the dyes used in the black ink has an oxidation potential more positive than 1.0 V (vs. SCE), preferably more positive than 1.1 V (vs SCE), more preferably more positive than 1.15 V (vs SCE), and at least one of the dyes preferably has λmax of 500 nm or longer (condition 3).

The oxidation potential used in the present invention is a value measured in N,N-dimethylformamide (concentration of compound: $1\times10^{-3}$ mol·dm$^{-3}$) containing 0.1 mol·dm$^{-3}$ of tetrapropylammonium perchlorate as the supporting electrolyte by using SCE (saturated calomel electrode) as the reference electrode, a graphite electrode as the working electrode and a platinum electrode as the counter electrode. In the case of a water-soluble dye, the dye is sometimes hardly dissolved directly in N,N-dimethylformamide. In such a case, the oxidation potential is measured after dissolving the dye by using water in a small amount as much as possible and then diluting it with N,N-dimethylformamide to have a water content of 2% or less.

The oxidation potential value sometimes deviates on the order of several tens of millivolts due to the effect of liquid junction potential, liquid resistance of sample solution, or the like, but the reproducibility of the potential value measured can be guaranteed by calibration using a standard sample (for example, hydroquinone).

The black ink for use in the present invention is preferably an azo dye represented by formula (BK1) shown below. The azo dye represented by formula (BK1) includes those falling under the dye (L) having λmax in the region from 500 to 700 nm and having a half-value width of 100 nm or more in the absorption spectrum of a dilute solution standardized to an absorbance of 1.0. Further, a dye (S) having λmax in the region from 350 to 500 nm is also included in the dye represented by formula (BK1). An ink where at least one dye (L) is the dye of formula (Bk1) is preferred, an ink where at least one dye (L) and at least one dye (S) are the dyes of formula (BK1) is more preferred, and an ink where 90 wt % of all dyes in the ink is occupied by the dye of formula (BK1) is still more preferred (condition 4).

Formula (BK1):

The black ink which can be used in the present invention is a black ink satisfying at least one of these conditions 1 to 4.

Of the dyes represented by formula (BK1), the dye falling under the dye (L) is described in detail below.

In formula (BK1), A, B and C each independently represent an aromatic group which may be substituted or a heterocyclic group which may be substituted (A and C are monovalent groups respectively and B is a divalent group), m represents 1 or 2, and n represents an integer of 0 or more.

A compound where m and n each is 1 or 2 is preferred and in this case, at least two of A, B and C are preferably an unsaturated heterocyclic group which may be substituted. In particular, a compound where m and n are 1 and at least B and C are each an unsaturated heterocyclic group is more preferred.

The azo dye represented by formula (BK1) is preferably a dye represented by the following formula (BK2):
Formula (BK2):

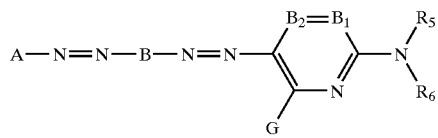

wherein A and B have the same meanings as in formula (BK1), respectively; $B_1$ and $B_2$ each represent =$CR_1$— or —$CR_2$= or either one of $B_1$ and $B_2$ represents a nitrogen atom and the other represents =$CR_1$— or —$CR_2$=; G, $R_1$ and $R_2$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be further substituted; $R_5$ and $R_6$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent, provided that $R_5$ and $R_6$ are not hydrogen atoms at the same time; or $R_1$ and $R_5$, or $R_5$ and $R_6$ may combine to form a 5- or 6-membered ring.

The azo dye represented by formula (BK2) is more preferably a dye represented by the following formula (BK3):
Formula (BK3):

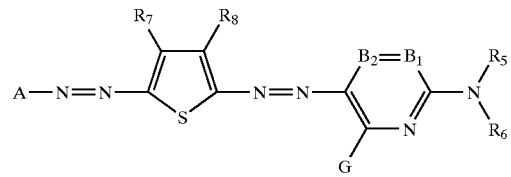

wherein $R_7$ and $R_8$ each have the same meanings as $R_1$ in formula (BK2).

The halogen atom includes a fluorine atom, a chlorine atom and a bromine atom. The aliphatic group means an alkyl group, a substituted alkyl group, an alkenyl group, a substituted alkenyl group, an alkynyl group, a substituted alkynyl group, an aralkyl group and a substituted aralkyl group. The aliphatic group may be branched or may form a ring. The number of carbon atoms in the aliphatic group is preferably from 1 to 20, more preferably from 1 to 16. The aryl moiety in the aralkyl group and the substituted aralkyl group is preferably phenyl or naphthyl, more preferably phenyl. Examples of the aliphatic group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

The monovalent aromatic group means an aryl group and a substituted aryl group. The aryl group is preferably a phenyl group or a naphthyl group, more preferably a phenyl group. The number of carbon atoms in the monovalent aromatic group is preferably from 6 to 20, more preferably from 6 to 16. Examples of the monovalent aromatic group include a phenyl group, a p-tolyl group, a p-methoxyphenyl group, an o-chlorophenyl group and an m-(3-sulfopropylamino)phenyl group. The divalent aromatic group is a divalent form of the monovalent aromatic groups and examples thereof include a phenylene group, a p-tolylene group, a p-methoxyphenylene group, an o-chlorophenylene group, an m-(3-sulfopropylamino) phenylene group and a naphthylene group.

The heterocyclic group includes a heterocyclic group having a substituent and an unsubstituted heterocyclic group. The heterocyclic ring may be condensed with an aliphatic ring, an aromatic ring or other heterocyclic ring. The heterocyclic group is preferably a 5- or 6-membered heterocyclic group. Examples of the heteroatom in the heterocyclic ring include N, O and S. Examples of the substituent include an aliphatic group, a halogen atom, an alkylsulfonyl group, an arylsulfonyl group, an acyl group, an acylamino group, a sulfamoyl group, a carbamoyl group and an ionic hydrophilic group. Examples of the heterocyclic ring used in the monovalent or divalent heterocyclic group include a pyridine ring, a thiophene ring, a thiazole ring, a benzothiazole ring, a benzoxazole ring and a furan ring.

The carbamoyl group includes a carbamoyl group having a substituent and an unsubstituted carbamoyl group.

Examples of the substituent include an alkyl group. Examples of the carbamoyl group include a methylcarbamoyl group and a dimethylcarbamoyl group.

The alkoxycarbonyl group includes an alkoxycarbonyl group having a substituent and an unsubstituted alkoxycarbonyl group. The alkoxycarbonyl group is preferably an alkoxycarbonyl group having from 2 to 20 carbon atoms. Examples of the substituent include an ionic hydrophilic group. Examples of the alkoxycarbonyl group include a methoxycarbonyl group and an ethoxycarbonyl group.

The aryloxycarbonyl group includes an aryloxycarbonyl group having a substituent and an unsubstituted aryloxycarbonyl group. The aryloxycarbonyl group is preferably an aryloxycarbonyl group having from 7 to 20 carbon atoms. Examples of the substituent include an ionic hydrophilic group. Examples of the aryloxycarbonyl group include a phenoxycarbonyl group.

The heterocyclic oxycarbonyl group includes a heterocyclic oxycarbonyl group having a substituent and an unsubstituted heterocyclic oxycarbonyl group. The heterocyclic oxycarbonyl group is preferably a heterocyclic oxycarbonyl group having from 2 to 20 carbon atoms. Examples of the substituent include an ionic hydrophilic group. Examples of the heterocyclic oxycarbonyl group include a 2-pyridyloxycarbonyl group.

The acyl group includes an acyl group having a substituent and an unsubstituted acyl group. The acyl group is preferably an acyl group having from 1 to 20 carbon atoms. Examples of the substituent include an ionic hydrophilic group. Examples of the acyl group include an acetyl group and a benzoyl group.

The alkoxy group includes an alkoxy group having a substituent and an unsubstituted alkoxy group. The alkoxy group is preferably an alkoxy group having from 1 to 20 carbon atoms. Examples of the substituent include an alkoxy group, a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group includes an aryloxy group having a substituent and an unsubstituted aryloxy group. The aryloxy group is preferably an aryloxy group having from 6 to 20 carbon atoms. Examples of the substituent include an alkoxy group and an ionic hydrophilic group. Examples of the aryloxy group include a phenoxy group, a p-methoxyphenoxy group and an o-methoxyphenoxy group.

The heterocyclic oxy group includes a heterocyclic oxy group having a substituent and an unsubstituted heterocyclic oxy group. The heterocyclic oxy group is preferably a heterocyclic oxy group having from 2 to 20 carbon atoms. Examples of the substituent include an alkyl group, an alkoxy group and an ionic hydrophilic group. Examples of the heterocyclic oxy group include a 3-pyridyloxy group and a 3-thienyloxy group.

The silyloxy group is preferably a silyloxy group substituted by an aliphatic or aromatic group having from 1 to 20 carbon atoms. Examples of the silyloxy group include a trimethylsilyloxy group and a diphenylmethylsilyloxy group.

The acyloxy group includes an acyloxy group having a substituent and an unsubstituted acyloxy group. The acyloxy group is preferably an acyloxy group having from 1 to 20 carbon atoms. Examples of the substituent include an ionic hydrophilic group. Examples of the acyloxy group include an acetoxy group and a benzoyloxy group.

The carbamoyloxy group includes a carbamoyloxy group having a substituent and an unsubstituted carbamoyloxy group. Examples of the substituent include an alkyl group. Examples of the carbamoyloxy group include an N-methylcarbamoyloxy group.

The alkoxycarbonyloxy group includes an alkoxycarbonyloxy group having a substituent and an unsubstituted alkoxycarbonyloxy group. The alkoxycarbonyloxy group is preferably an alkoxycarbonyloxy group having from 2 to 20 carbon atoms. Examples of the alkoxycarbonyloxy group include a methoxycarbonyloxy group and an isopropoxycarbonyloxy group.

The aryloxycarbonyloxy group includes an aryloxycarbonyloxy group having a substituent and an unsubstituted aryloxycarbonyloxy group. The aryloxycarbonyloxy group is preferably an aryloxycarbonyloxy group having from 7 to 20 carbon atoms. Examples of the aryloxycarbonyloxy group include a phenoxycarbonyloxy group.

The amino group includes an amino group substituted by an alkyl group, an aryl group or a heterocyclic group, and the alkyl group, the aryl group and the heterocyclic group each may further have a substituent. The alkylamino group is preferably an alkylamino group having from 1 to 20 carbon atoms. Examples of the substituent include an ionic hydrophilic group. Examples of the alkylamino group include a methylamino group and a diethylamino group.

The arylamino group includes an arylamino group having a substituent and an unsubstituted arylamino group. The arylamino group is preferably an arylamino group having from 6 to 20 carbon atoms. Examples of the substituent include a halogen atom and an ionic hydrophilic group. Examples of the arylamino group include an anilino group and a 2-chlorophenylamino group.

The heterocyclic amino group includes a heterocyclic amino group having a substituent and an unsubstituted heterocyclic amino group. The heterocyclic amino group is preferably a heterocyclic amino group having from 2 to 20 carbon atoms. Examples of the substituent include an alkyl group, a halogen atom and an ionic hydrophilic group.

The acylamino group includes an acylamino group having a substituent and an unsubstituted acylamino group. The acylamino group is preferably an acylamino group having from 2 to 20 carbon atoms. Examples of the substituent include an ionic hydrophilic group. Examples of the acylamino group include an acetylamino group, a propionylamino group, a benzoylamino group, an N-phenylacetylamino group and a 3,5-disulfobenzoylamino group.

The ureido group includes a ureido group having a substituent and an unsubstituted ureido group. The ureido group is preferably a ureido group having from 1 to 20 carbon atoms. Examples of the substituent include an alkyl group and an aryl group. Examples of the ureido group include a 3-methylureido group, a 3,3-dimethylureido group and a 3-phenylureido group.

The sulfamoylamino group includes a sulfamoylamino group having a substituent and an unsubstituted sulfamoylamino group. Examples of the substituent include an alkyl group. Examples of the sulfamoylamino group include an N,N-dipropylsulfamoylamino group.

The alkoxycarbonylamino group includes an alkoxycarbonylamino group having a substituent and an unsubstituted alkoxycarbonylamino group. The alkoxycarbonylamino group is preferably an alkoxycarbonylamino group having from 2 to 20 carbon atoms. Examples of the substituent include an ionic hydrophilic group. Examples of the alkoxycarbonylamino group include an ethoxycarbonylamino group.

The aryloxycarbonylamino group includes an aryloxycarbonylamino group having a substituent and an unsubstituted aryloxycarbonylamino group. The aryloxycarbonylamino group is preferably an aryloxycarbonylamino group having from 7 to 20 carbon atoms. Examples of the substituent include an ionic hydrophilic group. Examples of the aryloxycarbonylamino group include a phenoxycarbonylamino group.

The alkylsulfonylamino group includes an alkylsulfonylamino group having a substituent and an unsubstituted alkylsulfonylamino group, and the arylsulfonylamino group includes an arylsulfonylamino group having a substituent and an unsubstituted arylsulfonylamino group. The sulfonylamino group is preferably a sulfonylamino group having from 1 to 20 carbon atoms. Examples of the substituent include an ionic hydrophilic group. Examples of these sulfonylamino groups include a methylsufonylamino group, an N-phenyl-methylsulfonylamino group, a phenylsulfonylamino group and a 3-carboxyphenylsulfonylamino group.

The heterocyclic sulfonylamino group includes a heterocyclic sulfonylamino group having a substituent and an unsubstituted heterocyclic sulfonylamino group. The heterocyclic sulfonylamino group is preferably a heterocyclic sulfonylamino group having from 1 to 12 carbon atoms. Examples of the substituent include an ionic hydrophilic group. Examples of the heterocyclic sulfonylamino group include a 2-thiophenesulfonylamino group and a 3-pyridinesulfonylamino group.

The heterocyclic sulfonyl group includes a heterocyclic sulfonyl group having a substituent and an unsubstituted heterocyclic sulfonyl group. The heterocyclic sulfonyl group is preferably a heterocyclic sulfonyl group having from 1 to 20 carbon atoms. Examples of the substituent include an ionic hydrophilic group. Examples of the heterocyclic sulfonyl group include a 2-thiophenesulfonyl group and a 3-pyridinesulfonyl group.

The heterocyclic sulfinyl group includes a heterocyclic sulfinyl group having a substituent and an unsubstituted heterocyclic sulfinyl group. The heterocyclic sulfinyl group is preferably a heterocyclic sulfinyl group having from 1 to 20 carbon atoms. Examples of the substituent include an ionic hydrophilic group. Examples of the heterocyclic sulfinyl group include a 4-pyridinesulfinyl group.

The alkylthio group includes an alkylthio group having a substituent and an unsubstituted alkylthio group, the arylthio group includes an arylthio group having a substituent and an unsubstituted arylthio group, and the heterocyclic thio group includes a heterocyclic thio group having a substituent and an unsubstituted heterocyclic thio group. The alkylthio group, the arylthio group and the heterocyclic thio group are preferably an alkylthio group having from 1 to 20 carbon atoms, an arylthio group having from 1 to 20 carbon atoms and a heterocyclic thio group having from 1 to 20 carbon atoms, respectively. Examples of the substituent include an ionic hydrophilic group. Examples of the alkylthio group, arylthio group and heterocyclic thio group include a methylthio group, a phenylthio group and a 2-pyridylthio group.

The alkylsulfonyl group includes an alkylsulfonyl group having a substituent and an unsubstituted alkylsulfonyl group, and the arylsulfonyl group includes an arylsulfonyl group having a substituent and an unsubstituted arylsulfonyl group. Examples of the alkylsulfonyl group and arylsulfonyl group include a methylsulfonyl group and a phenylsulfonyl group.

The alkylsulfinyl group includes an alkylsulfinyl group having a substituent and an unsubstituted alkylsulfinyl group, and the arylsulfinyl group includes an arylsulfinyl group having a substituent and an unsubstituted arylsulfinyl group. Examples of the alkylsulfinyl group and arylsulfinyl group include a methylsulfinyl group and a phenylsulfinyl group.

The sulfamoyl group includes a sulfamoyl group having a substituent and an unsubstituted sulfamoyl group. Examples of the substituent include an alkyl group. Examples of the sulfamoyl group include a dimethylsulfamoyl group and a di-(2-hydroxyethyl)sulfamoyl group.

Formulae (BK1), (BK2) and (BK3) are described in detail below.

In the following, those described above for each group or substituent are also applied.

In formula (BK1), A, B and C each independently represents an aromatic group (A and C each is a monovalent aromatic group such as aryl group, and B is a divalent aromatic group such as arylene group) which may be substituted, or a heterocyclic group (A and C each is a monovalent heterocyclic group and B is a divalent heterocyclic group) which may be substituted. Examples of the aromatic ring include a benzene ring and a naphthalene ring. Examples of the heteroatom in the heterocyclic ring include N, O and S. The heterocyclic ring may be condensed with an aliphatic ring, an aromatic ring or another heterocyclic ring.

The substituent may be an arylazo group or a heterocyclic azo group.

At least two of A, B and C are preferably heterocyclic groups.

The heterocyclic group represented by C is preferably an aromatic nitrogen-containing 6-membered heterocyclic group represented by the following formula (BK4). When C is the aromatic nitrogen-containing 6-membered heterocyclic group represented by formula (BK4), formula (BK1) corresponds to formula (BK2).

Formula (BK4):

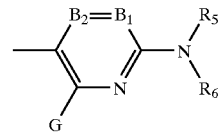

In formula (BK4), $B_1$ and $B_2$ each represents =$CR_1$— or —$CR_2$= or either one of $B_1$ and $B_2$ represents a nitrogen atom and the other represents =$CR_1$— or —$CR_2$=. $B_1$ and $B_2$ each is preferably =$CR_1$— or —$CR_2$=.

$R_5$ and $R_6$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent. The substituent represented by $R_5$ and $R_6$ is preferably a hydrogen atom, an aliphatic group, an aromatic group, a heterocyclic group, an acyl group, an alkylsulfonyl group or an arylsulfonyl group, more preferably a hydrogen atom, an aromatic group, a heterocyclic group, an acyl group, an alkylsulfonyl group or an arylsulfonyl group, and most preferably a hydrogen atom, an aryl group or a heterocyclic group, and each group may further have a substituent. However, $R_5$ and $R_6$ are not hydrogen atoms at the same time.

G, $R_1$ and $R_2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be further substituted.

The substituent represented by G is preferably a hydrogen atom, a halogen atom, an aliphatic group, an aromatic group, a hydroxyl group, an alkoxy group, an aryloxy group, an acyloxy group, a heterocyclic oxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylthio group, an arylthio group or a heterocyclic thio group, more preferably a hydrogen atom, a halogen atom, an alkyl group, a hydroxy group, an alkoxy group, an aryloxy group, an acyloxy group, an amino group (including an alkylamino group, an arylamino group and a heterocyclic amino group) or an acylamino group, and most preferably a hydrogen atom, an anilino group or an acylamino group, and each group may further have a substituent.

The substituents represented by $R_1$ and $R_2$ each is preferably a hydrogen atom, an alkyl group, a halogen atom, an alkoxycarbonyl group, a carboxyl group, a carbamoyl group, a hydroxy group, an alkoxy group or a cyano group, and each group may further have a substituent.

$R_1$ and $R_5$, or $R_5$ and $R_6$ may combine to form a 5- or 6-membered ring.

When the substituents represented by A, $R_1$, $R_2$, $R_5$, $R_6$ and G each further has a substituent, examples of the substituent include the substituents described above for G, $R_1$ and $R_2$. Also, an ionic hydrophilic group is preferably further present as a substituent on any one of A, $R_1$, $R_2$, $R_5$, $R_6$ and G.

Examples of the ionic hydrophilic group as a substituent include a sulfo group, a carboxyl group, a phosphono group and a quaternary ammonium group. Among the ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium).

When B has a ring structure, preferred examples of the heterocyclic ring include a thiophene ring, a thiazole ring, an imidazole ring, a benzothiazole ring and a thienothiazole ring. Each heterocyclic group may further have a substituent. Among the heterocyclic rings, a thiophene ring, a thiazole ring, an imidazole ring, a benzothiazole ring and a thienothiazole ring represented by the following formulae (a) to (e) respectively are preferred. When m=n=1, B is a thiophene ring represented by formula (a), and C is a structure represented by formula (4), formula (BK1) corresponds to formula (BK3).

Formula (a):

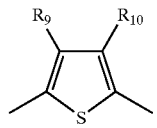

Formula (b):

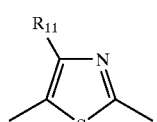

Formula (c):

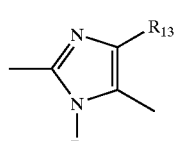

Formula (d):

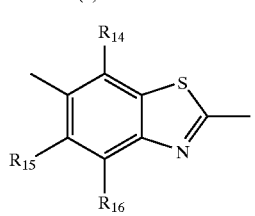

Formula (e):

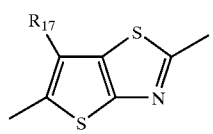

wherein $R_9$ to $R_{17}$ each represent a substituent having the same meaning as G, $R_1$ and $R_2$ in formula (BK2).

In the present invention, particularly preferred is a dye represented by the following formula (BK5):

Formula (BK5):

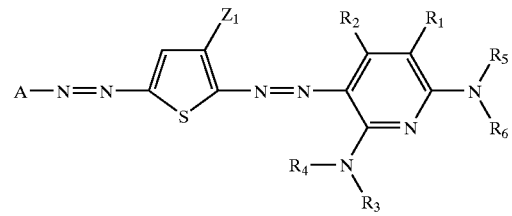

In formula (BK5), $Z_1$ represents an electron-withdrawing group having a Hammett's substituent constant σp value of 0.20 or more. $Z_1$ is preferably an electron-withdrawing group having a σp value of 0.30 or more, more preferably 0.45 or more, still more preferably 0.60 to more, but the σp value preferably does not exceed 1.0. Specific preferred examples of the substituent include electron-withdrawing substituents described later. Among those, preferred are an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms and a halogenated alkyl group having from 1 to 20 carbon atoms, more preferred are a cyano group, an alkylsulfonyl group having from 1 to 20 carbon atoms and an arylsulfonyl group having from 6 to 20 carbon atoms, and most preferred is a cyano group.

$R_1$, $R_2$, $R_5$ and $R_6$ have the same meanings as in formula (BK2); $R_3$ and $R_4$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, preferably a hydrogen atom, an aromatic group, a heterocyclic group, an acyl group, an alkylsulfonyl group or an arylsulfonyl group, more preferably a hydrogen atom, an aromatic group or a heterocyclic group.

The groups described in regard to formula (BK5) each may further have a substituent. When these groups each further has a substituent, examples of the substituent include the substituents described in regard to formula (BK2), the groups described as examples for G, $R_1$ and $R_2$, and ionic hydrophilic groups.

Now, the Hammett's substituent constant σp value used in the present invention is described. The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of conventional publications and these are described in detail, for example, in J. A. Dean (compiler), *Lange's Handbook of Chemistry*, 12th ed., McGraw-Hill (1979), and *Kagakuno Ryoiki* (*Chemistry Region*), special number, No. 122, pp. 96–103, Nankodo (1979). In the present invention, each substituent is limited or described by using the Hammett's substituent constant $\sigma_p$ but it does not mean that the substituent is limited only to those having a known value which can be found in the above-described publications. Needless to say, the substituent includes substituents of which $\sigma_p$ value is not known in publications but when measured based on the Hammett's rule, falls within the range specified. Furthermore, although the azo dyes for the black ink of the present invention include those which are not benzene derivatives, the $\sigma_p$ value is used as a measure for showing the electron effect of the substituent irrespective of the substitution site. In the present invention, the $\sigma_p$ value is used in such a meaning.

Examples of the electron-withdrawing group having a Hammett's substituent constant $\sigma_p$ value of 0.60 or more include a cyano group, a nitro group, an alkylsulfonyl group (e.g., methanesulfonyl) and an arylsulfonyl group (e.g., benzenesulfonyl).

Examples of the electron-withdrawing group having a Hammett's $\sigma_p$ value of 0.45 or more include, in addition to those described above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl) and a halogenated alkyl group (e.g., trifluoromethyl).

Examples of the electron-withdrawing group having a Hammett's substituent constant $\sigma_p$ value of 0.30 or more include, in addition to those described above, an acyloxy group (e.g., acetoxy), a, carbamoyl group (e.g., N-ethylcarbamoyl, N,N-dibutylcarbamoyl), a halogenated alkoxy group (e.g., trifluoromethyloxy), a halogenated aryloxy group (e.g., pentafluorophenyloxy), a sulfonyloxy group (e.g., methylsulfonyloxy), a halogenated alkylthio group (e.g., difluoromethylthio), an aryl group substituted by two or more electron-withdrawing groups having a $\sigma_p$ value of 0.15 or more (e.g., 2,4-dinitrophenyl, pentachlorophenyl) and a heterocyclic ring (e.g., 2-benzoxazolyl, 2-benzothiazolyl, 1-phenyl-2-benzimidazolyl).

Specific examples of the electron-withdrawing group having a $\sigma_p$ value of 0.20 or more include, in addition to those described above, a halogen atom.

The preferred combination of substituents in the azo dye represented by formula (BK3) is described below. $R_5$ and $R_6$ each is preferably a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group. However, $R_5$ and $R_6$ are not hydrogen atoms at the same time.

G is preferably a hydrogen atom, a halogen atom, an alkyl group, a hydroxyl group, an amino group or an acylamino group, more preferably a hydrogen atom, a halogen atom, an amino group or an acylamino group, and most preferably a hydrogen atom, an amino group or an acylamino group.

A is preferably an aromatic group, a pyridine ring, a pyrazole ring, an imidazole ring, an isothiazole ring, a benzisothiazole ring, a thiadiazole ring, a thiazole ring, a benzothiazole ring or a triazole ring, more preferably an aromatic group, a pyridine ring, an isothiazole ring, a benzisothiiazole ring, a thiadiazole ring or a benzothiazole ring, and most preferably an aromatic group, a pyridine ring or a bentzothiazole ring.

$B_1$ and $B_2$ each is =CR$_1$— or —CR$_2$=, and $R_1$ and $R_2$ each is preferably a hydrogen atom, an alkyl group, a halogen atom, a cyano group, a carbamoyl group, a carboxyl group, a hydroxyl group, an alkoxy group or an alkoxycarbonyl group, more preferably a hydrogen atom, an alkyl group, a carboxyl group, a cyano group or a carbamoyl group.

As for the preferred combination of substituents in the compound represented by formula (BK1), a compound where at least one of various substituents is the above-described preferred group is preferred, a compound where a larger number of various substituents are the above-described preferred groups is more preferred, and a compound where all substituents are the above-described preferred groups is most preferred.

Specific examples of the azo dye represented by formula (BK1) are set forth below, however, the azo dye for use in the present invention is not limited to those set forth below. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium).

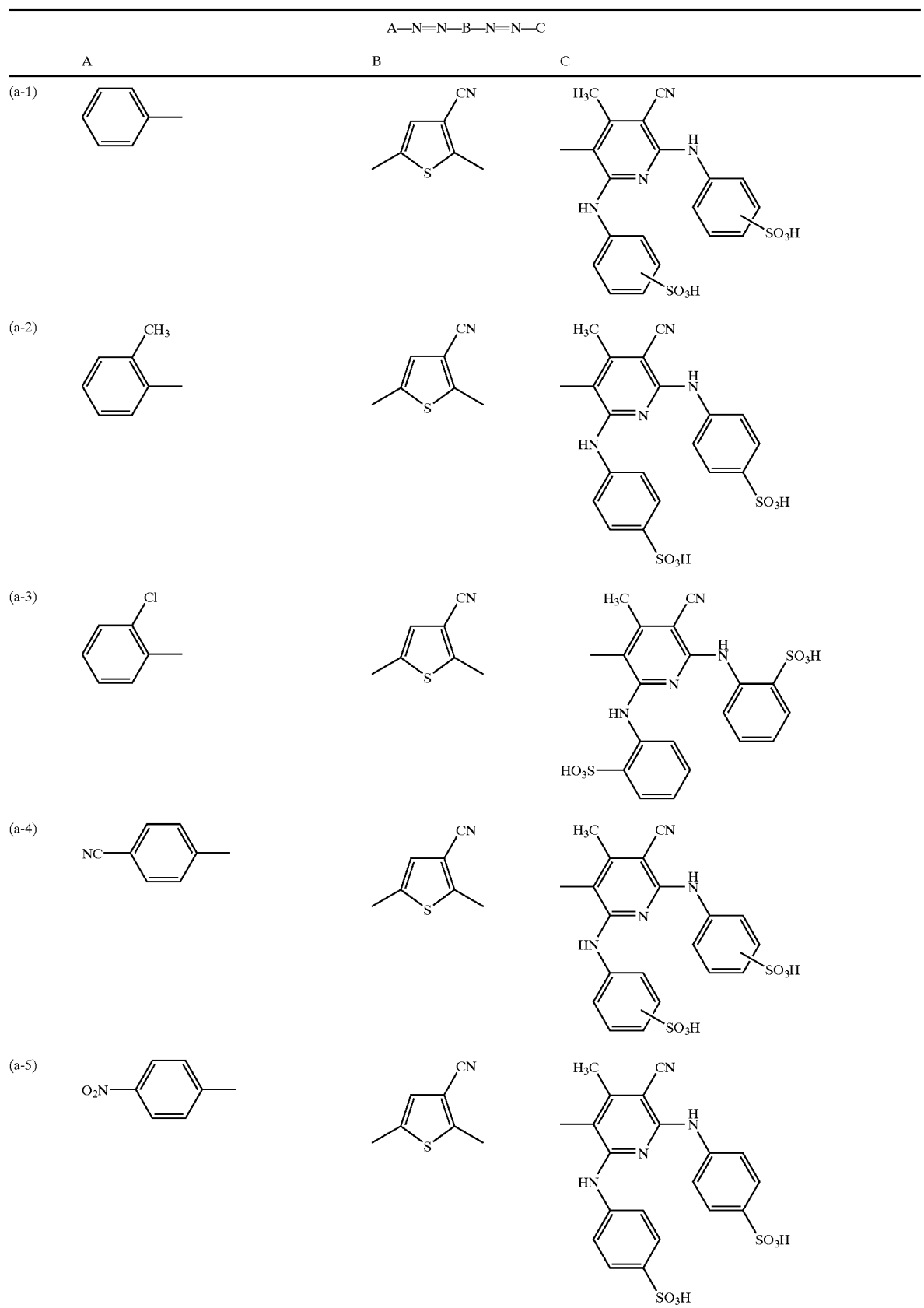

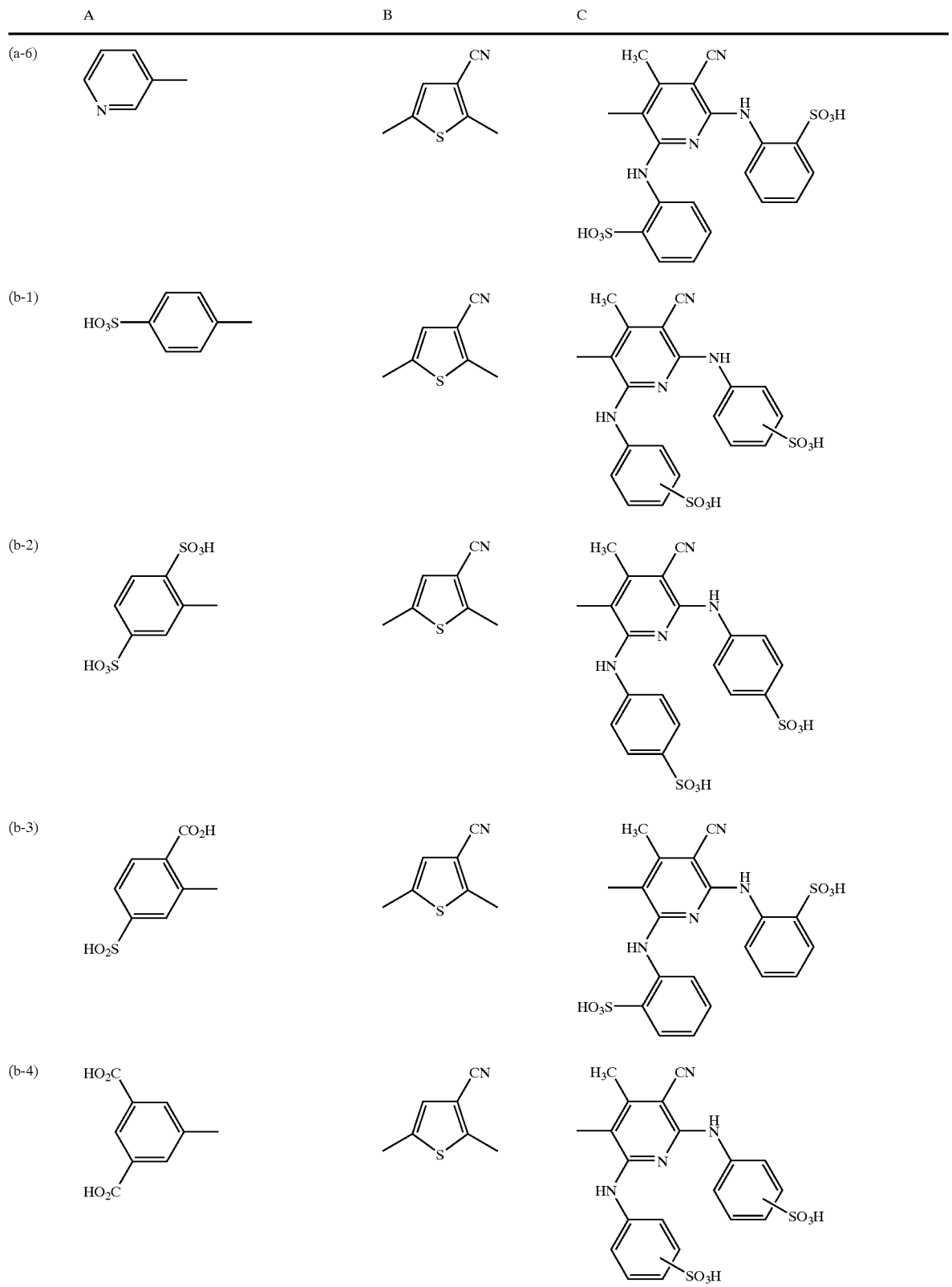

US 6,923,854 B2
-continued
A—N=N—B—N=N—C
| | A | B | C |
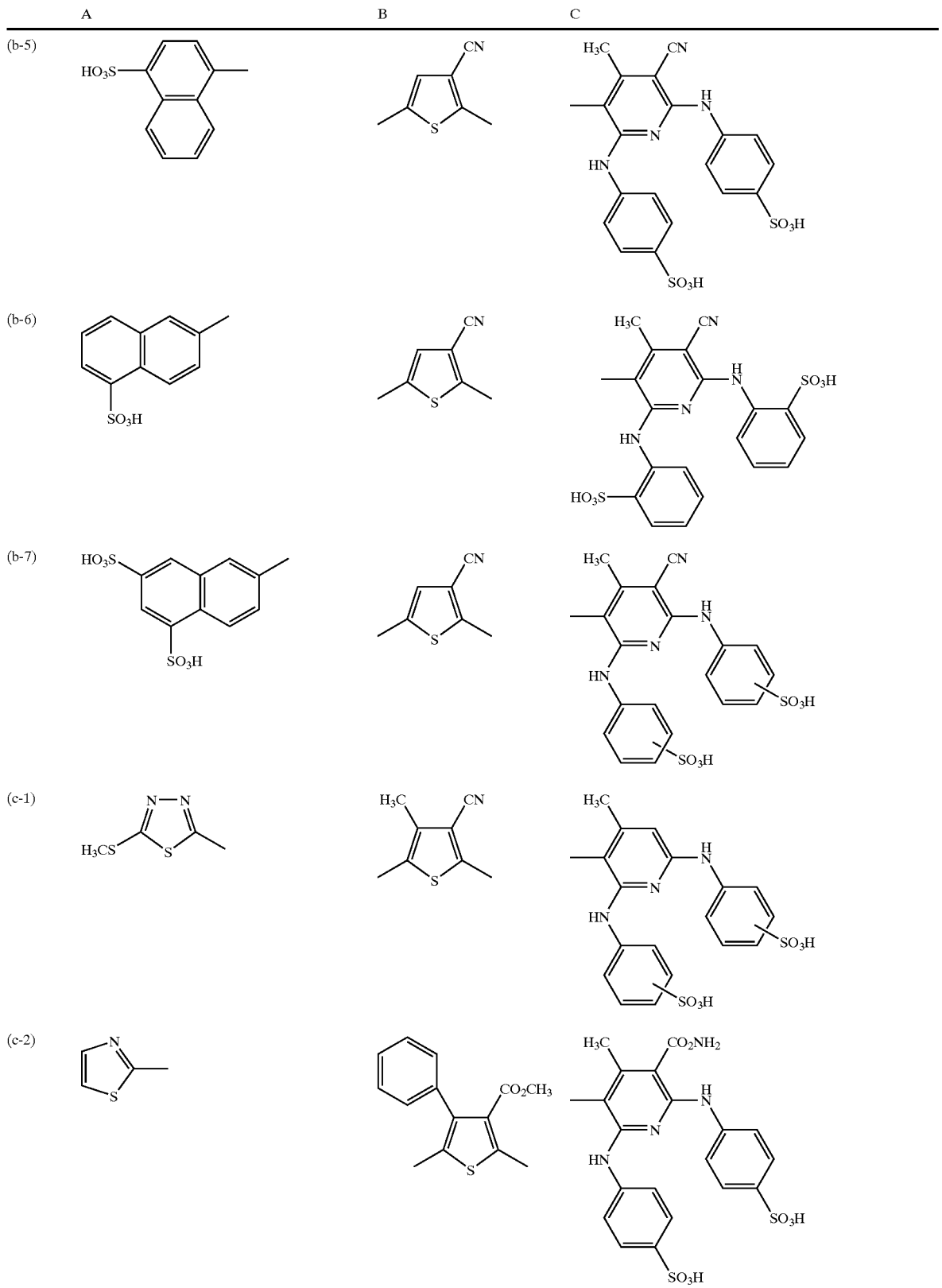

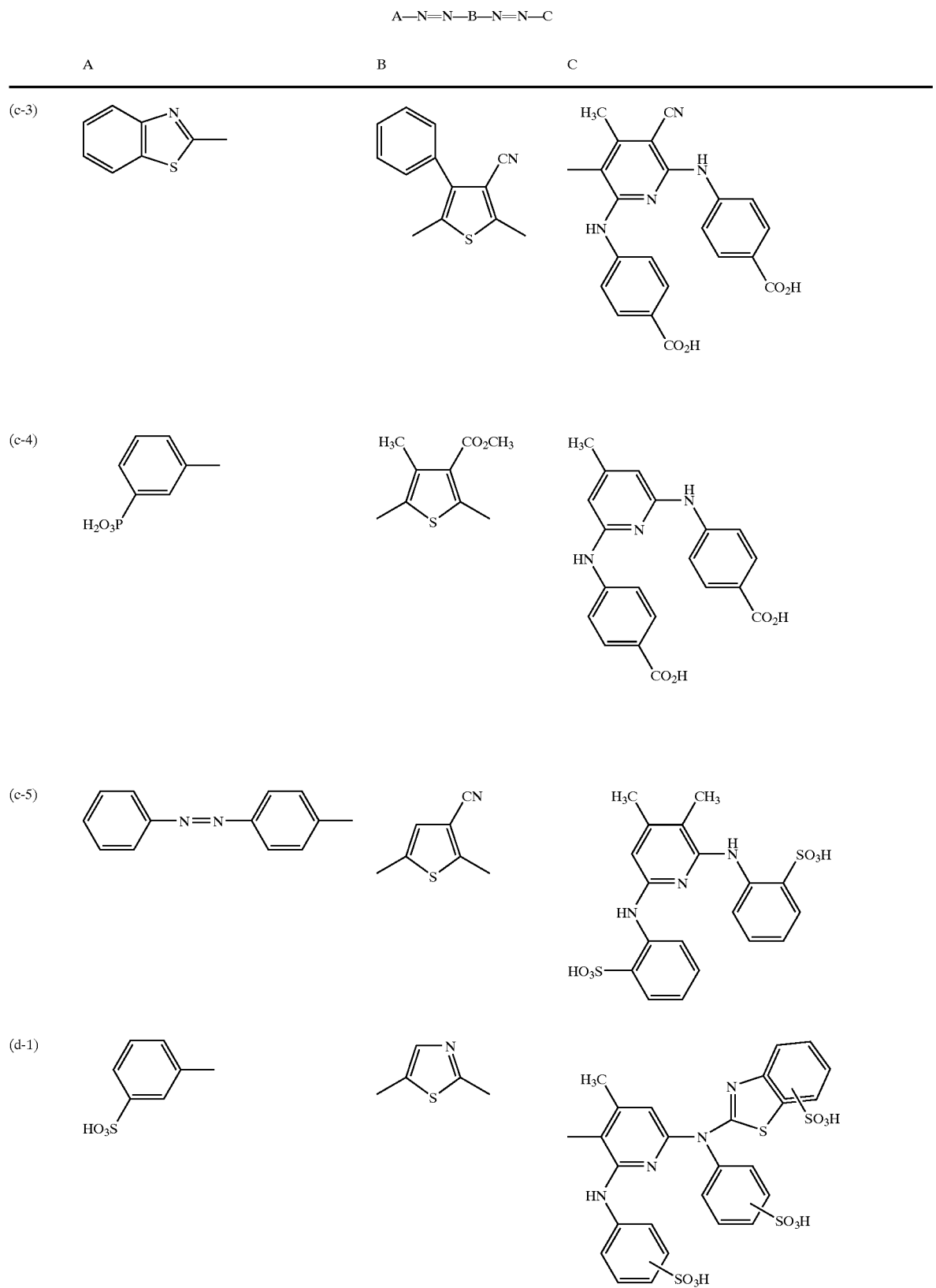

-continued
A—N=N—B—N=N—C
| | A | B | C |
|---|---|---|---|
| (d-2) | 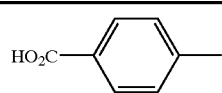 | 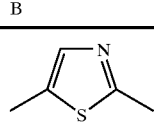 | 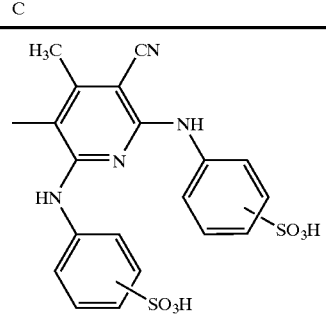 |
| (d-3) | 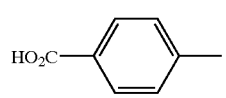 | 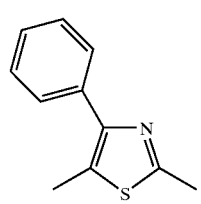 | 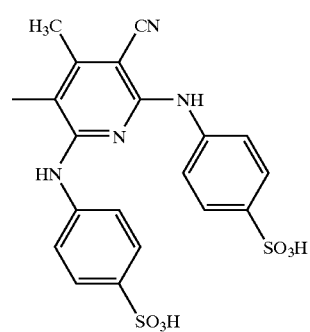 |
| (d-4) | 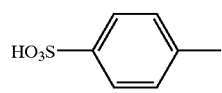 | 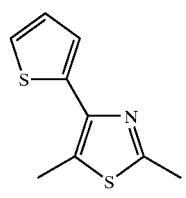 | 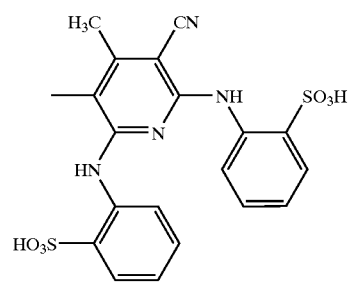 |
| (d-5) | 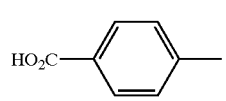 | 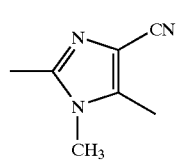 | 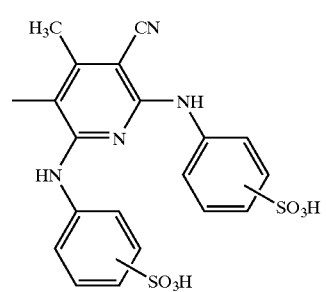 |
| (d-6) | 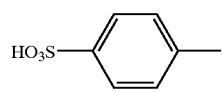 | 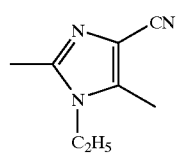 | 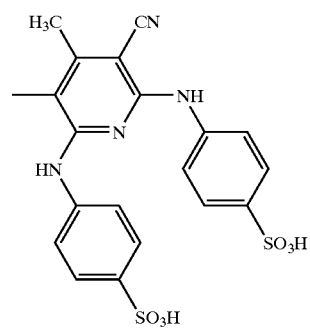 |

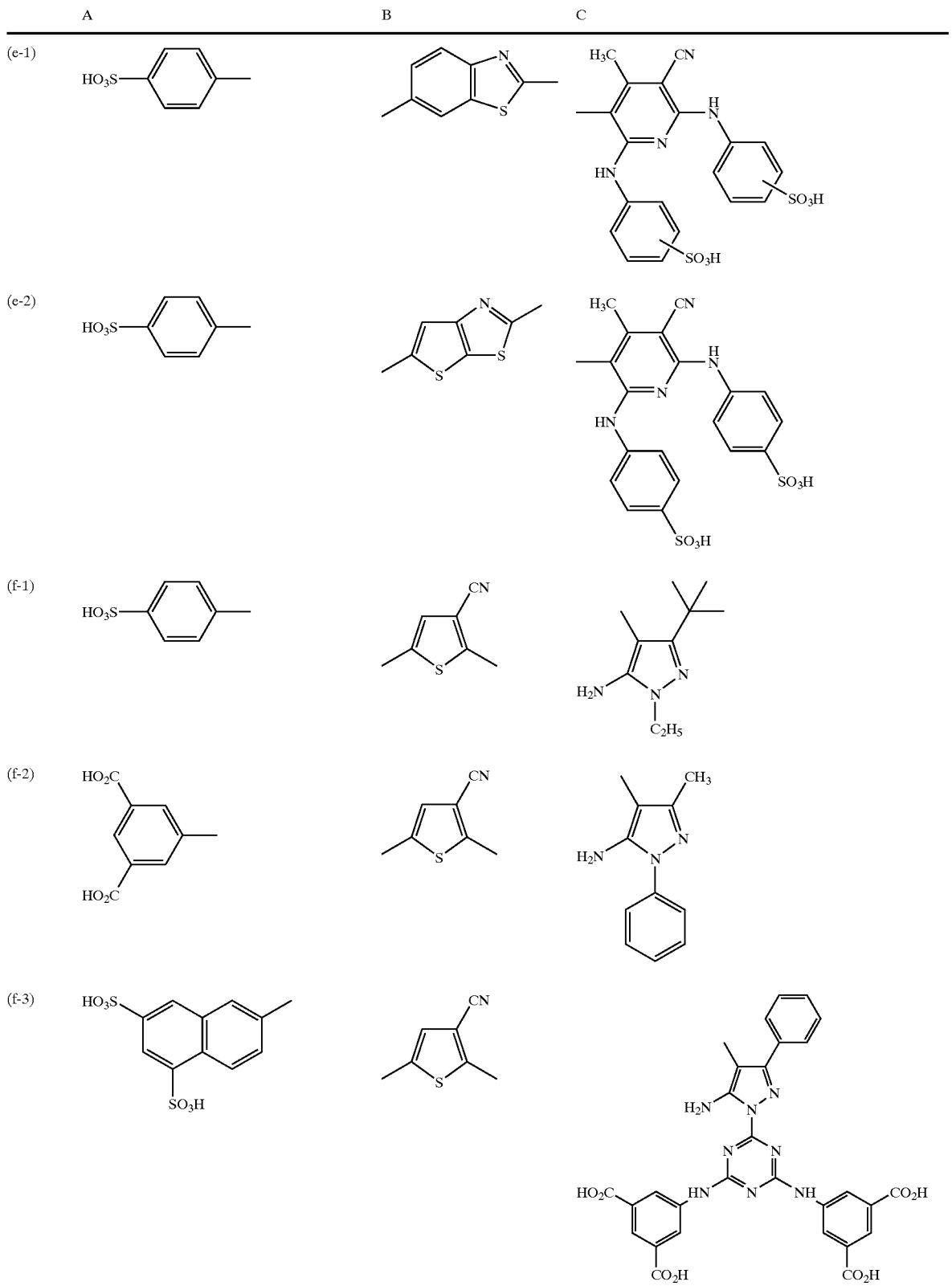

-continued

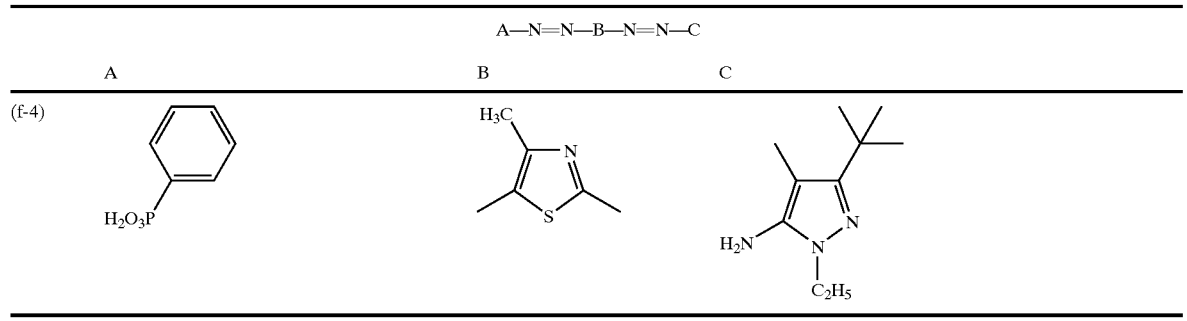

(f-4) A: phenyl-H₂O₃P; B: H₃C-thiazole-CH₃; C: tert-butyl-methyl-pyrazole with H₂N and N-C₂H₅

The dyes represented by formulae (BK1), (BK2), (BK3) and (BK5) can be synthesized by a coupling reaction of a diazo component and a coupler. As the main synthesis method, the method described in JP-A-2003-306623 can be used.

In the case where the dye (L) by itself can realize black of high image quality "pure black" (that is, black which is not dependent on the light source at the observation and less susceptible to stress of any one color tone of B, G and R), the dye may be used alone as the dye for black ink. However, in general, a dye for covering the region where the dye (L) has low absorption is usually used in combination. A dye or pigment having main absorption in the yellow region is usually used in combination to realize the preferred black. As the yellow dye, commonly employed direct dyes, acid dyes and the like, representatively azo dyes and azomethine dyes, can be used. As the pigment, an aqueous dispersion of a conventional pigment having a pigment number can be used in combination. In particular, a dye represented by formula (BK1) as the short-wave dye (S) described above is preferably used.

Among the dyes represented by formula (BK1), an azo dye where m=n=0 is firstly preferred as the short-wave dye (S). In such a case, A and C each is preferably a heteroaromatic ring. An azo dye where m=n=1 is next preferred.

In either case, the dye preferably has an oxidation potential (Eox) of more positive than 1.0 V (vs SCE), more preferably more positive than 1.15 V (vs SCE).

In the black ink, at least two long-wave dyes can also be used in combination.

Furthermore, the black ink can also be produced by using other dyes in combination.

The black ink for inkjet recording method contains the dye of formula (BK1) in an amount of 0.2 to 25 wt %, preferably from 0.5 to 15 wt %, based on the entire ink.

For the dye having λmax in the region from 350 to 500 nm, a yellow dye or pigment described later can be also used.

The above-described black dye is substantially soluble or dispersible in water. In particular, the ink composition containing the black dye of the present invention is preferably a solution-type ink composition using a water-soluble dye. More specifically, the solubility of the dye in water at 20° C. is preferably 2 wt % or more, more preferably 5 wt % or more.

The dyes other than the black dye for use in the present invention are preferably a substantially water-soluble or water-dispersible dye. More specifically, the solubility of the dye in water at 20° C. is preferably 2 wt % or more, more preferably 5 wt % or more.

In the case of producing two or more inks, one ink may be produced as a light-type ink and another may be produced as a dark ink. In the present invention, such inks can be produced. Further, ink compositions which provide almost the same printed density can be produced.

Examples of the dye which can be used other than the black dye include dyes known in the field of art, such as triarylmethane dye, anthraquinone dye, anthrapyridone dye, azomethine dye, azo dye, cyanine dye, merocyanine dye and oxonol dye, and these dyes can be used individually or in combination (preferably in combination of giving a black dye). Among these, azo dyes are preferred.

More specifically, examples of the yellow dye include aryl- or heteryl-azo dyes having a phenol, a naphthol, an aniline, a pyrazolone, a pyridone or an open chain active methylene compound as the coupling component; azomethine dyes having an open chain active methylene compound as the coupling component; methine dyes such as benzylidene dye and monomethine oxonol dye; and quinone-base dyes such as naphthoquinone dye and anthraquinone dye. Other examples of the dye species include quinophthalone dye, nitro.nitroso dye, acridine dye and acridinone dye. Such a dye may be a dye which provides a yellow color for the first time when a part of the chromophore is dissociated. In such a case, a counter cation may be an inorganic cation such as alkali metal and ammonium, an organic cation such as pyridinium and quaternary ammonium salt, or a polymer cation having such a cation in a partial structure.

Examples of the magenta dye include aryl- or heteryl-azo dyes having a phenol, a naphthol or an aniline as the coupling component; azomethine dyes having a pyrazolone or a pyrazolotriazole as the coupling component; methine dyes such as arylidene dye, styryl dye, merocyanine dye and oxonol dye;, carbonium dyes such as diphenylmethane dye, triphenylmethane dye and xanthene dye; quinone-base dyes such as naphthoquinone, anthraquinone and anthrapyridone; and condensed polycyclic dyes such as dioxazine dye. These dyes may be a dye which provides a magenta color for the first time when a part of the chromophore is dissociated. In such a case, a counter cation may be an inorganic cation such as alkali metal and ammonium, an organic cation such as pyridinium and quaternary ammonium salt, or a polymer cation having such a cation in a partial structure.

Examples of the cyan dye include azomethine dyes such as indoaniline dye and indophenol dye; polymethine dyes such as cyanine dye, oxonol dye and merocyanine dye; carbonium dyes such as diphenylmethane dye, triphenylmethane dye and xanthene dye; phthalocyanine dyes; anthraquinone dyes; aryl- or heteryl-azo dyes having a phenol, a naphthol or an aniline as the coupling component; and indigo.thioindigo dyes. These dyes may be a dye which provides a cyan color for the first time when a part of the chromophore is dissociated. In such a case, a counter cation may be an inorganic cation such as alkali metal and ammonium, an organic cation such as pyridinium and quaternary ammonium salt, or a polymer cation having such a cation in a partial structure.

Examples of the water-soluble dye include a direct dye, an acid dye, a food dye, a basic dye and a reactive dye. Preferred examples thereof include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243 and 247; C.I. Direct Violet 7, 9, 47, 48, 51, 66, 90, 93, 94, 95, 98, 100 and 101; C.I. Direct Yellow 8, 9, 11, 12, 27, 28, 29, 33, 35, 39, 41, 44, 50, 53, 58, 59, 68, ,86, 87, 93, 95, 96, 98, 100, 106, 108, 109, 110, 130, 132, 142, 144, 161 and 163; C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291; C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199; C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397; C.I. Acid Violet 5, 34, 43, 47, 48, 90, 103 and 126; C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227; C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326; C.I. Acid Black 7, 24, 29, 48, 52:1 and 172; C.I. Reactive Red 3, 13, 17, 19, 21, 22, 23, 24, 29, 35, 37, 40, 41, 43, 45, 49 and 55; C.I. Reactive Violet 1, 3, 4, 5, 6, 7, 8, 9, 16, 17, 22, 23, 24, 26, 27, 33 and 34; C.I. Reactive Yellow 2, 3, 13, 14, 15, 17, 18, 23, 24, 25, 26, 27, 29, 35, 37, 41 and 42; C.I. Reactive Blue 2, 3, 5, 8, 10, 13, 14, 15, 17, 18, 19, 21, 25, 26, 27, 28, 29 and 38; C.I. Reactive Black 4, 5, 8, 14, 21, 23, 26, 31, 32 and 34; C.I. Basic Red 12, 13, 14, 15, 18, 22, 23, 24, 25, 27, 29, 35, 36, 38, 39, 45 and 46; C.I Basic Violet 1, 2, 3, 7, 10, 15, 16, 20, 21, 25, 27, 28, 35, 37, 39, 40 and 48; C.I. Basic Yellow 1, 2, 4, 11, 13, 14, 15, 19, 21, 23, 24, 25, 28, 29, 32, 36, 39 and 40; C.I. Basic Blue 1, 3, 5, 7, 9, 22, 26, 41, 45, 46, 47, 54, 57, 60, 62, 65, 66, 69 and 71; and C.I. Basic Black 8.

In the ink set of the present invention, other dyes may be used in combination with the above-described dyes so as to adjust the color tone for obtaining a full color image. Examples of the dye which can be used in combination include the dyes described above and the following pigments.

As the pigment which can be used in the present invention, commercially available pigments and known pigments described in various publications can be used. Examples of the publication include *Colour Index*, compiled by The Society of Dyers and Colourists, *Kaitei Shin Han Ganryo Binran* (*Revised New Handbook of Pigments*), compiled by Nippon Ganryo Gijutsu Kyokai (1989), *Saishin Ganryo Oyo Gijutsu* (*Newest Pigment Application Technology*), CMC Shuppan (1986), *Insatsu Ink Gijutsu* (*Printing Ink Technique*), CMC Shuppan (1984), and W. Herbst and K. Hunger, *Industrial Organic Pigments*, VCH Verlagsgesellschaft (1993). Specific examples of the pigment include organic pigments such as azo pigments (e.g., azo lake pigment, insoluble azo pigment, condensed azo pigment, chelate azo pigment), polycyclic pigments (e.g., phthalocyanine-base pigment, anthraquinone-base pigment, perylene-base or perynone-base pigment, indigo-base pigment, quinacridone-base pigment, dioxazine-base pigment, isoindolinone-base pigment, quinophthalone-base pigment, diketopyrrolopyrrole-base pigment), dyeing lake pigments (lake pigments of acid or basic dye) and azine pigments, and inorganic pigments such as C.I. Pigment Yellow 34, 37, 42 and 53 which are a yellow pigment, C.I. Pigment Red 101 and 108 which are a red-type pigment, C.I. Pigment Blue 27, 29 and 17:1 which are a blue-type pigment, C.I. Pigment Black 7 and magnetite which are a black-type pigment, and C.I. Pigment White 4, 6, 18 and 21 which are a white-type pigment.

The pigment having a color tone preferred for the formation of an image includes the followings. As the blue to cyan pigment, phthalocyanine pigments, anthraquinone-type indanthrone pigments (for example, C.I. Pigment Blue 60) and dyeing lake pigment-type triarylcarbonium pigments are preferred, and phthalocyanine pigments are most preferred (preferred examples thereof include copper phthalocyanine such as C.I. Pigment Blue 15:1, 15:2, 15:3, 15:4 and 15:6, monochloro or low chlorinated copper phthalocyanine, aluminum phthalocyanine such as pigments described in European Patent 860475, nonmetallic phthalocyanine such as C.I. Pigment Blue 16, and phthalocyanine with the center metal being Zn, Ni or Ti, and among these, C.I. Pigment Blue 15:3 and 15:4 and aluminum phthalocyanine are more preferred).

As the red to violet pigment, azo pigments (preferred examples thereof include C.I. Pigment Red 3, 5, 11, 22, 38, 48:1, 48:2, 48:3, 48:4, 49:1, 52:1, 53:1, 57:1, 63:2, 144, 146 and 184, and among these, C.I. Pigment Red 57:1, 146 and 184 are more preferred), quinacridone-base pigments (preferred examples thereof include C.I. Pigment Red 122, 192, 202, 207 and 209 and C.I. Pigment Violet 19 and 42, and among these, C.I. Pigment Red 122 is more preferred), dyeing lake pigment-type triarylcarbonium pigments (preferred examples thereof include xanthene-base C.I. Pigment Red 81:1 and C.I. Pigment Violet 1, 2, 3, 27 and 39), dioxazine-base pigments (for example, C.I. Pigment Violet 23 and 37), diketopyrrolopyrrole-base pigments (for example, C.I. Pigment Red 254), perylene pigments (for example, C.I. Pigment Violet 29), anthraquinone-base pigments (for example, C.I. Pigment Violet 5:1, 31 and 33) and thioindigo-base pigments (for example, C.I. Pigment Red 38 and 88) are preferred.

As the yellow pigment, azo pigments (preferred examples thereof include monoazo pigment-type C.I. Pigment Yellow 1, 3, 74 and 98, disazo pigment-type C.I. Pigment Yellow 12, 13, 14, 16, 17 and 83, synthetic azo-type C.I. Pigment Yellow 93, 94, 95, 128 and 155, and benzimidazolone-type C.I. Pigment Yellow 120, 151, 154, 156 and 180, and among these, those not using a benzidine-base compound as a raw material are more preferred), isoindoline.isoindolinone-base pigments (preferred examples thereof include C.I. Pigment Yellow 109, 110, 137 and 139), quinophthalone pigments (preferred examples thereof include C.I. Pigment Yellow 138) and flavanthrone pigments (for example, C.I. Pigment Yellow 24) are preferred.

As the black pigment, inorganic pigments (preferred examples thereof include carbon black and magnetite) and aniline black are preferred.

Other than these, an orange pigment (for example, C.I. Pigment Orange 13 and 16) and a green pigment (for example, C.I. Pigment Green 7) may be used.

The pigment which can be used in the present invention may be the above-described pigment which is not subjected to any treatment or is subjected to a surface treatment. For the surface treatment a method of coating the surface with resin or wax, a method of attaching a surfactant, and a method of binding a reactive substance (for example, a radical generated from a silane coupling agent, an epoxy compound, polyisocyanate or a diazonium salt) to the pigment surface may be used and these are described in the following publications and patents:

(1) *Kinzoku Sekken no Seishitsu to Oyo* (*Properties and Applications of Metal Soap*), Saiwai Shobo Co., Ltd.;

(2) *Insatsu Ink Insatsu* (*Printing Ink Printing*), CMC Publishing Co., Ltd. (1984);

(3) *Saishin Ganryo Oyo Gijutsu* (*Newest Pigment Application Technology*), CMC Publishing Co., Ltd. (1986);

(4) U.S. Pat. Nos. 5,554,739 and 5,571,311; and (5) JP-A-9-151342, JP-A-10-140065, JP-A-10-292143 and JP-A-11-166145.

Particularly, self-dispersible pigments prepared by allowing a diazonium salt to act on carbon black described in U.S. Patents of (4) and capsulated pigments prepared by the method described in JP-As of (5) are effective, because dispersion stability can be obtained without using an excess dispersant in the ink.

In the ink of the present invention, the pigment may be dispersed by further using a dispersant. Various known dispersants can be used according to the pigment used, for example, a surfactant-type low molecular dispersant or a polymer-type dispersant can be used. Examples of the dispersant include those described in JP-A-3-69949 and European Patent 549,486. In case of using the dispersant, a pigment derivative called synergist may also be added so as to accelerate the adsorption of dispersant to the pigment.

The particle size of the pigment which can be used in the present invention is, after the dispersion, preferably from 0.01 to 10 µm, more preferably from 0.05 to 1 µm.

As for the method of dispersing the pigment, known dispersion techniques used for the production of ink or toner can be used. Examples of the dispersing machine include vertical or horizontal agitator mill, attritor, colloid mill, ball mill, three-roll mill, pearl mill, super-mill, impeller, disperser, KD mill, dynatron and pressure kneader. These are described in detail in *Saishin Ganryo Oyo Gijutsu* (*Newest Figment Application Technology*), CMC Publishing Co., Ltd. (1986).

Other components which can be contained in the ink composition of the ink set for inkjet recording of the present invention are described below.

The ink composition for inkjet recording may contain a surfactant to control the liquid properties of the ink composition, whereby excellent effects can be provided, such as enhancement of the ejection stability of the ink composition, improvement of water resistance of the image and prevention of bleeding of the printed ink composition.

Examples of the surfactant include anionic surfactants such as sodium dodecylsulfate, sodium dodecyloxysulfonate and sodium alkylbenzenesulfonate, cationic surfactants such as cetylpyridinium chloride, trimethylcetylammonium chloride and tetrabutylammonium chloride, and nonionic surfactants such as polyoxyethylene nonylphenyl ether, polyoxyethylene naphthyl ether and polyoxyethylene octylphenyl ether. Among these, nonionic surfactants are preferred.

The surfactant content is from 0.001 to 15 wt %, preferably from 0.005 to 10 wt %, more preferably from 0.01 to 5 wt %, based on the ink composition.

Examples of the water-soluble organic solvent which can be used in the present invention include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl other, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). The water-soluble organic solvents can be used in combination of two or more thereof. The water-soluble organic solvents which are soluble in water in an amount of 20% by weight or more at 25° C. are preferably used. Among these, water-soluble organic solvents having a boiling point of 150° C. or more are preferred in the present invention.

In the case where the above-described dye is an oil-soluble dye, the ink composition can be prepared by dissolving the oil-soluble dye in a high boiling point organic solvent and emulsion-dispersing it in an aqueous medium.

The high boiling point organic solvent for use in the present invention has a boiling point of 150° C. or more, preferably 170° C. or more.

Examples thereof include phthalic acid esters (e.g., dibutyl phthalate, dioctyl phthalate, dicyclohexyl phthalate, di-2-ethylhexyl phthalate, decyl phthalate, bis(2,4-di-tert-amylphenyl)isophthalate, bis(1,1-diethylpropyl)phthalate), esters of phosphoric acid or phosphone (e.g., diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate, di-2-ethylhexylphenyl phosphate), benzoic acid esters (e.g., 2-ethylhexyl benzoate, 2,4-dichlorobenzoate, dodecyl benzoate, 2-ethylhexyl-p-hydroxybenzoate), amides (e.g., N,N-diethyldodecanamide, N,N-diethyllaurylamide), alcohols or phenols (e.g., isostearyl alcohol, 2,4-di-tert-amylphenol), aliphatic ester (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tert-octylaniline), chlorinated paraffins (e.g., paraffins having a chlorine content of 10 to 80%), trimesic acid esters (e.g., tributyl trimesate), dodecylbenzene, diisopropylnaphthalene, phenols (e.g., 2,4-di-tert-amylphenyl, 4-dodecyloxyphenol, 4-dodecyloxycarbonylphenol, 4-(4-dodecyloxyphenylsulfonyl)phenol), carboxylic acids (e.g., 2-(2,4-di-tert-amylphenoxy)butyric acid, 2-ethoxyoctanedecanoic acid) and alkylphosphoric acids (e.g., di-(2-ethylhexyl)phosphoric acid, diphenylphosphoric acid).

The high boiling point organic solvents may be used individually or as a mixture of several kinds thereof (for example, tricresyl phosphate and dibutyl phthalate, trioctyl phosphate and di(2-ethylhexyl) sebacate, or dibutyl phthalate and poly(N-tert-butylacrylamide)).

Examples of the high boiling point organic solvent for use in the present invention, other than the above-described compounds, and/or the synthesis method of the high boiling point organic solvents are described, for example, in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-A-276319, EP-A-286253, EP-A-289820, EP-A-309158, EP-A-309159, EP-A-309160, EP-A-509311, EP-A-510576, East German Patents 147,009, 157,147, 159,573 and 225, 240A, British Patent 2091124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946 and JP-A-4-346338.

The high boiling point organic solvent can be used in an amount of from 0.01 to 3 times, preferably from 0.01 to 1.0 time in terms of the weight ratio to the oil-soluble dye.

In the present invention, the oil-soluble dye or high boiling point organic solvent is used by emulsion-dispersing it in an aqueous medium. Depending on the case, a low boiling point organic solvent may also be used at the emulsion-dispersion in view of emulsifiability. The low boiling point organic solvent is an organic solvent having a boiling point of about 30 to 150° C. at atmospheric pressure. Preferred examples thereof include esters (e.g., ethyl acetate, butyl acetate, ethyl propionate, β-ethoxyethyl acetate, methylcellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone) and ethers (e.g., tetrahydrofuran, dioxane), however, the present invention is not limited thereto.

In the emulsion-dispersion, an oil phase obtained by dissolving the dye in a high boiling organic solvent or depending on the case, in a mixed solvent of a high boiling organic solvent and a low boiling organic solvent is dispersed in an aqueous phase mainly comprising water to form fine oil droplets of the oil phase. At this time, in either one or both of the aqueous phase and the oil phase, an additive described later, such as surfactant, wetting agent, dye stabilizer, emulsification stabilizer, antiseptic or fungicide, can be added, if desired.

In a conventional emulsification method, an oil phase is added to an aqueous phase, however, a so-called phase inversion emulsification method of adding dropwise an aqueous phase in an oil phase can also be preferably used.

In performing the emulsion-dispersion of the present invention, various surfactants can be used. Preferred examples thereof include anionic surfactants such as fatty acid salt, alkylsulfuric ester salt, alkylbenzenesulfonate, alkylnaphthalenesulfonate, dialkylsulfosuccinate, alkylphosphoric, ester salt, naphthalenesulfonic acid formalin condensate and polyoxyethylene, alkylsulfuric ester salt, and noniotic surfactants such as polyoxyethylene alkyl ether, polyoxyethylene alkylaryl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which are an acetylene-base polyoxyethylene oxide surfactant, are preferably used. Furthermore, amine oxide-type amphoteric surfactants such as N,N-dimethyl-N-alkylamine oxide are preferred. In addition, surfactants described in JP-A-59-157636 (pages (37) to (38)) and *Research Disclosure*, No. 308119 (1989) can also be used.

For the purpose of stabilizing the dispersion immediately after the emulsification, a water-soluble polymer may be added in combination with the surfactant. Preferred examples of the water-soluble polymer include polyvinyl alcohol, polyvinylpyrrolidone, polyethylene oxide, polyacrylic acid, polyacrylamide and copolymers thereof. Also, natural water-soluble polymers such as polysaccharides, casein and gelatin are also preferably used. Furthermore, for the stabilization of the dye dispersion, a polymer which does not substantially dissolve in an aqueous medium, such as vinyl polymer, polyurethane, polyester, polyamide, polyurea and polycarbonate obtained by the polymerization of acrylic acid esters, methacrylic acid esters, vinyl, esters, acrylamides, methacrylamides, olefins, styrenes, vinyl ethers or acrylonitriles, can also be used in combination. The polymer preferably contains —$SO_3^-$ or —$COO^-$. In the case of using such a polymer which does not substantially dissolve in an aqueous medium, the polymer is preferably used in an amount of 20 wt % or less, more preferably 10 wt % or less, based on the high boiling point organic solvent used.

In preparing an aqueous ink composition by dispersing the oil-soluble dye and high boiling point organic solvent according to emulsion-dispersion, control of the particle size is particularly important. In order to increase the color purity or density of an image formed by the inkjet recording, it is essential to reduce the average particle size. The average particle size is preferably 1 μm or less, more preferably from 5 to 100 nm in terms of the volume average particle size.

The volume average particle size and particle size distribution of the dispersed particles can be easily measured by a known method such as static light scattering method, dynamic light scattering method, centrifugal precipitation method and the method described in *Jikken Kagaku Koza* (*Lecture of Experimental Chemistry*), 4th ed., pp. 417–418. For example, the ink composition is diluted with distilled water to have a particle concentration of 0.1 to 1 wt %, then, the particle size can be easily measured by a commercially available volume average particle size measuring apparatus (for example, Microtrac UPA, manufactured by Nikkiso K.K.). The dynamic light scattering method utilizing the laser Doppler effect is particularly preferred because even a small particle size can be measured.

The volume average particle size is an average particle size weighted with the particle volume and it is obtained by multiplying the diameter of individual particles with the volume of the particle and dividing the sum total of the obtained values by the total volume of the particles in the gathering of particles. The volume average particle size is described in Soichi Muroi, *Kobunshi Latex no Kagaku* (*Chemistry of Polymer Latex*), page 119, Kobunshikankoukai Co., Ltd.

Also, it is revealed that the presence of coarse particles greatly affects the printing performance. More specifically, the coarse particle clogs the nozzle of head or even if the nozzle is not clogged, forms a soil to bring about failure or twist in the ejection of ink, whereby the printing performance is seriously affected. In order to prevent such troubles, it is important to reduce the number of particles having a particle size of 5 μm or more to 10 or less and the number of particles having a particle size of 1 μm or more to 1,000 or less, in 1 μl of ink prepared.

For removing the coarse particles, a known method such as centrifugal separation or microfiltration can be used. The separation step may be performed immediately after the emulsion-dispersion or may be performed immediately before filling the ink in an ink cartridge after various additives such as wetting agent and surfactant are added to the emulsified dispersion.

A mechanically emulsifying apparatus is effective for reducing the average particle size and eliminating coarse particles.

As for the emulsifying apparatus, known apparatuses such as simple stirrer, impeller stirring system, in-line stirring system, mill system (e.g., colloid mill) and ultrasonic system can be used, however, a high-pressure homogenizer is particularly preferably used.

The mechanism of the high-pressure homogenizer is described in detail in U.S. Pat. No. 4,533,254 and JP-A-6-47264. Examples of the commercially available apparatus include Gaulin Homogenizer (manufactured by A.P. V Gaulin Inc.), Microfluidizer (manufactured by Microfluidex Inc.) and Altimizer. (produced by Sugino Machine Ltd.).

The high-pressure homogenizer with a mechanism of pulverizing particles in an ultrahigh pressure jet stream recently described in U.S. Pat. No. 5,720,551 is particularly effective for the emulsion-dispersion of the present invention. Examples of the emulsifying apparatus using such ultrahigh pressure jet stream include DeBEE2000 (manufactured by BEE International Ltd.).

In performing the emulsification by a high-pressure emulsion-dispersing apparatus, the pressure is 50 MPa or more, preferably 60 MPa or more, more preferably 180 MPa or more.

A method of using two or more emulsifying apparatuses, for example, by performing the emulsification in a stirring emulsifier and then passing the emulsified product through a high-pressure homogenizer is particularly preferred. Also, a method of once performing the emulsion-dispersion by such an emulsifying apparatus, adding additive such as wetting agent and surfactant, and then again passing the dispersion through a high-pressure homogenizer before the time of filling the ink into a cartridge is preferred.

In the case of containing a low boiling point organic solvent in addition to the high boiling point organic solvent, the low boiling point solvent is preferably removed in view of stability of the emulsified product, safety and hygiene. For removing the low boiling point solvent, various known methods can be used according to the kind of the solvent. Examples of the method include evaporation, vacuum evaporation and ultrafiltration. The removal of the low boiling point organic solvent is preferably performed as soon as possible immediately after the emulsification.

In the ink composition for inkjet recording according to the present invention, additives such as drying inhibitor for preventing clogging due to drying of ink at the ejection port, permeation accelerator for attaining more successful permeation of ink into paper, ultraviolet absorbent, antioxidant, viscosity adjusting agent, surface tension adjusting agent, dispersant, dispersion stabilizer, fungicide, rust inhibitor and pH adjusting agent, can be appropriately selected and used in an appropriate amount.

The drying inhibitor for use in the present invention is preferably a water-soluble organic solvent having a vapor pressure lower than water. Specific examples thereof include polyhydric alcohols such as ethylene glycol, propylene glyscol, diethylene glycol, polyethylene glycol, thiodiglycol, dithiodiglycol, 2-methyl-1,3-propanediol, 1,2, 6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl(or ethyl) ether, and triethylene glycol monoethyl(or butyl) ether; heterocyclic compounds such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. The drying inhibitors may be used individually or in combination of two or more thereof. The drying inhibitor is preferably contained in an amount of 10 to 50 wt % in the ink.

Examples of the permeation accelerator which can be used in the present invention include alcohols such as ethanol, isopropanol, butanol, di(tri)ethylene glycol monobutyl ether and 1,2-hexanediol, sodium laurylsulfate, sodium oleate and nonionic surfactants. A sufficiently high effect can be obtained by adding from 10 to 30 wt % of the permeation accelerator in the ink. The permeation accelerator is preferably used in an amount of causing no bleeding of printed letter or no print through.

Examples of the ultraviolet absorbent which can be used in the present invention for improving the preservability of image include benzotriazole-base compounds described in JP-A-58-185677, JP-A-61-190537, JP-A-2-782, JP-A-5-197075 and JP-A-9-34057, benzophenone-base compounds described in JP-A-46-2784, JP-A-5-194483 and U.S. Pat. No. 3,214,463, cinnamic acid-base compounds described in JP-B-48-30492 (the term "JP-B" as used herein means an "examined Japanese patent publication"), JP-B-56-21141 and -JP-A-10-88106, triazine-base compounds described in JP-A-4-298503, JP-A-8-53427, JP-A-8-239368, JP-A-10-182621 and JP-T-8-501291 (the term "JP-T" as used herein means a "published Japanese translation of a PCT patent application"), compounds described in Research Disclosure No. 24239, and compounds of absorbing ultraviolet light and emitting fluorescent light, so-called fluorescent brightening agents, represented by stilbene-base compounds and benzoxazole-base compounds.

As the antioxidant which can be used in the present invention for improving the preservability of image, various organic or metal complex discoloration inhibitors can be used. Examples of the organic discoloration inhibitor include hydroquinones, alkoxyphenols, dialkoxyphenols, phenols, anilines, amines, indanes, chromans, alkoxyanilines and heterocyclic compounds. Examples of the metal complex include nickel complex and zinc complex. More specifically, compounds described in patents cited in Research Disclosure, Nos. 17643 (Items VII-I to VII-J), 15162, 18716 (page 650, left column), 36544 (page 527), 307105 (page 872) and 15162, and compounds included in formulae of representative compounds and specific examples thereof described in JP-A-62-215272 (pages 127 to 137) can be used.

Examples of the fungicide for use in the present invention include sodium dehydroacetate, sodium benzoate, sodium pyridinethione-1-oxide, ethyl p-hydroxybenzoate, 1,2-benzisothiazolin-3-one and salts thereof. The fungicide is preferably used in an amount of 0.02 to 5.00 wt % in the ink.

The fungicide is described in detail in *Bokin Bobai Zai Jiten* (*Dictionary of Microbicide and Fungicide*), compiled by Nippon Bokin Bobai Gakkai Jiten Henshu Iinkai.

Examples of the rust inhibitor include acidic sulfite, sodium thiosulfate, ammon thioglycolate, diisopropylammonium nitrite, pentaerythritol tetranitrate, dicyclohexylammonium nitrite and benzotriazole. The rust inhibitor is preferably used in an amount of 0.02 to 5.00 wt % in the ink.

The pH adjusting agent for use in the present invention can be suitably used for adjusting the pH and imparting dispersion stability. The pH of the ink is preferably adjusted to 8 to 11 at 25° C. When the pH is less than 8, the solubility of dye decreases to readily cause clogging of a nozzle, whereas when it exceeds 11, the water resistance is liable to deteriorate. Examples of the pH adjusting agent include organic bases and inorganic alkalis for basic compounds, and organic acids and inorganic acids for acidic compounds.

Examples of the organic base include triethanolamine, diethanolamine, N-methyldiethanolamine and dimethylethanolamine. Examples of the inorganic alkali include alkali metal hydroxides (e.g., sodium hydroxide, lithium hydroxide, potassium hydroxide), alkali metal carbonates (e.g., sodium carbonate, sodium hydrogencarbonate) and ammonium. Examples of the organic acid include an acetic acid, a propionic acid, a trifluoroacetic acid and an alkylsulfonic acid. Examples of the inorganic acid include hydrochloric acid, sulfuric acid and phosphoric acid.

In the present invention, apart from the betaine compound including surfactants, a nonionic, cationic or anionic surfactant is used as the surface tension adjusting agent. Examples thereof include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formal in condensate and polyoxyethylenealkylsulfuric ester salt, and nonionic surfactants such as polyoxyethylene alkyl ether, polyoxyethylene alkylaryl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air, Products & Chemicals), which are an acetylene-base polyoxyethylene oxide surfactant, are preferably used.

The surface tension of the ink for use in the present invention is, irrespective of dynamic surface tension or static surface tension, preferably from 20 to 50 mN/m, more preferably from 20 to 40 mN/m, at 25° C. When the surface tension exceeds 50 mN/m, ejection stability and printing quality, for example, bleeding due to color mixing or occurrence of feathering, are seriously deteriorated, whereas when the surface tension of the ink is less than 20 mN/m, printing failure may occur due to, for example, attachment of ink to the surface at the ejection.

The ink of the present invention preferably has a viscosity at 25° C. of 1 to 20 mPa·s, more preferably from 2 to 15 mPa·s, still more preferably from 2 to 10 mPa·s. When the viscosity exceeds 20 mPa·s, the fixing rate of the recorded image decreases and the ejection performance also decreases, whereas when it is less than 1 mPa·s, the bleeding occurred in the recorded image to decrease the grade.

The viscosity can be appropriately adjusted by the amount of the ink solvent added. Examples of the ink solvent include glycerin, diethylene glycol, triethanolamine, 2-pyrrolidone, diethylene glycol monobutyl ether and triethylene glycol monobutyl ether.

A viscosity adjusting agent may also be used. Examples of the viscosity adjusting agent include water-soluble polymers such as celluloses and polyvinyl alcohol, and nonionic surfactants. The viscosity adjusting agent is described in detail in *Nendo Chosei Gijutsu* (*Viscosity Adjusting Technology*), Chap. 9, Gijutsu Joho Kyokai (1999), and *Inkjet Printer Yo Chemicals* (98 *Zoho*)—*Zairyo no Kaihatsu Doko•Tenbo Chosa*—(*Chemicals for Inkjet Printer* (*Enlarged Edition of* 98)—*Survey on Tendency • Prospect of Development of Materials*—), pp. 162–174, CMC (1997).

In preparing the ink of the present invention, in the case of a water-soluble ink, the dye is preferably first dissolved in water and thereafter, various solvents and additives are added, dissolved and mixed to provide a uniform ink solution.

For dissolving the dye, various methods such as stirring, ultrasonic irradiation and shaking can be used. Among these, stirring is preferred. In performing the stirring, various systems known in this field can be used, such as flow stirring and stirring utilizing the shearing force by means of a reversal agitator or a dissolver. Also, a stirring method utilizing the shearing force with the bottom surface of a container, such as magnetic stirrer, can be advantageously used.

The recording paper and recording film as reflective media for use in the image recording method of the present invention are described below. The support which can be used for the recording paper or film is produced, for example, from a chemical pulp such as LBKP and NBKP, a mechanical pulp such as GP, PGW, RMP, TMP, CTMP, CMP and CGP, or a waste paper pulp such as DIP, by mixing, if desired, conventionally known additives such as pigment, binder, sizing agent, fixing agent, cation agent and paper strength increasing agent, and then sheeting the mixture by using various devices such as Fourdrinier paper machine and cylinder paper machine. Other than these supports, synthetic paper or plastic film may be used. The thickness of the support is preferably from 10 to 250 $\mu$m and the basis weight is preferably from 10 to 250 g/m².

An ink-receiving layer and a backcoat layer may be provided on the support as it is to produce an image-receiving material, or after providing a size press or an anchor coat layer by using starch, polyvinyl alcohol or the like, an ink-receiving layer and a backcoat layer may be provided to produce an image-receiving material. The support may be further subjected to a planarizing treatment by a calendering device such as machine calendar, TG calender and soft calender.

In the present invention, the support is preferably paper both surfaces of which are laminated with polyolefin (for example, polyethylene, polystyrene, polybutene or a copolymer thereof) or polyethylene terephthalate, or a plastic film. In the polyolefin, a white pigment (for example, titanium oxide or zinc oxide) or a tinting dye (for example, cobalt blue, ultramarine or neodymium oxide) is preferably added.

The ink-receiving layer provided on the support contains a porous material or an aqueous binder. Also, the ink-receiving layer preferably contains a pigment and the pigment is preferably a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene-base pigment, acryl-base pigment, urea resin and melamine resin. Among these, porous inorganic white pigments are preferred, and synthetic amorphous silica and the like having a large pore area are more preferred. The synthetic amorphous silica may be either a silicic acid anhydride obtained by a dry production method or a silicic acid hydrate obtained by a wet production method, but a silicic acid hydrate is preferred. The pigments may be used in combination of two or more thereof.

Examples of the aqueous binder contained in the ink-receiving layer include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivatives, and water dispersible polymers such as styrene butadiene latex and acryl emulsion. These aqueous binders may be used individually or in combination of two or more thereof. Among these, polyvinyl alcohol and silanol-modified polyvinyl alcohol are preferred in the present invention in view of adhesion to the pigment and peeling resistance of the ink-receiving layer.

The ink-receiving layer may contain a mordant, a water-proofing agent, a light fastness enhancer, a surfactant, a hardening agent and other additives in addition to the pigment and the aqueous binder.

The mordant added to the ink-receiving layer is preferably immobilized and for this purpose, a polymer mordant is preferably used.

The polymer mordant is described in JP-A-48-28325, JP-A-54-74430; JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in JP-A-1-161236 is used, an image having excellent image quality can be obtained and at the same time, the light fastness of the image is improved.

The water-proofing agent is effective for obtaining a water-resistant image. The water-proofing agent is preferably a cationic resin. Examples of the cationic resin include polyamidopolyamine epichlorohydrin, polyethyleneimine, polyaminesulfone, poly-dimethyldiallylammonium chloride, cation polyacrylamide and colloidal silica. Among these cationic resins, polyamidopolyamine epichlorohydrin is preferred. The content of the cationic resin is preferably from 1 to 15 wt %, more preferably from 3 to 10 wt %, based on the entire solid content of the ink-receiving layer.

Examples of the light fastness enhancer include zinc sulfate, zinc-oxide, hindered amine-base-antioxidants, and benzotriazole-base ultraviolet absorbents such as benzophenone. Among these, zinc sulfate is preferred.

The surfactant functions as a coating aid, an adherence improver, a slipperiness improver or an antistatic agent. The surfactant is described-in JP-A-62-173463 and JP-A-62-183457.

In place of the surfactant, an organic fluoro compound may be used. The organic fluoro compound is preferably hydrophobic. Examples of the organic fluoro compound include fluorine-containing surfactants, oily fluorine-base compounds (for example, fluorine oil) and solid fluorine compound resins (for example, ethylene tetrafluoride resin). The organic fluoro compound is described in JP-B-57-9053 (columns 8 to 17), JP-A-61-20994 and JP-A-62-135826.

As the hardening agent, for example, the materials described in JP-A-1-161236 (page 222) can be used.

Other examples of the additive added to the ink-receiving layer include a pigment dispersant, a thickener, a defoaming agent, a dye, a fluorescent brightening agent, an antiseptic, a pH adjusting agent and a matting agent. The ink-receiving layer may be composed of one layer or two layers.

In the recording paper or film, a backcoat layer may also be provided. Examples of the component which can be added to the layer include a white pigment, an aqueous binder and other components.

Examples of the white pigment contained in the backcoat layer include inorganic white pigments such as precipitated calcium carbonate light, ground calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrated halloysite, magnesium carbonate and magnesium hydroxide, and organic pigments such as styrene-base plastic pigment, acryl-base plastic pigment, polyethylene, microcapsule, urea resin and melamine resin.

Examples of the aqueous binder contained in the backcoat layer include water-soluble polymers such as styrene/maleate copolymer, styrene/acrylate copolymer, polyvinyl alcohol, silanol-modified polyvinyl alcohol, starch, cationized starch, casein, gelatin, carboxymethyl cellulose hydroxyethyl cellulose and polyvinylpyrrolidone, and water-dispersible polymers such as styrene butadiene latex and acryl emulsion. Other components contained in the backcoat layer include a defoaming agent, a foam inhibitor, a dye, a fluorescent brightening agent, an antiseptic and a water-proofing agent.

In a constituent layer (including the back layer) of the inkjet recording paper or film, a polymer fine particle dispersion may be added. The polymer fine particle dispersion is used for the purpose of improving film properties, for example, stabilizing dimension and preventing curling, adhesion or film cracking. The polymer fine particle dispersion is described in JP-A-62-245258, JP-A-62-1316648 and JP-A-62-110066. When a polymer fine particle dispersion having a low glass transition temperature (40° C. or less) is added to a layer containing a mordant, the layer can be prevented from cracking or curling. The curling can be prevented also by adding a polymer fine particle dispersion having a high glass transition temperature to the back layer.

The present invention is not limited in the inkjet recording system and is used for a known system, for example, an electric charge controlling system of ejecting the ink by utilizing the electrostatic induction force, a drop-on-demand system (pressure pulse system) utilizing an oscillation pressure of a piezoelectric element, an acoustic inkjet system wherein electric signals are converted into acoustic beams, and the ink is irradiated with the beam to eject the ink using the radiation pressure, and a thermal inkjet (bubble jet) system of heating the ink to form a bubble and ejecting the ink utilizing the generated pressure.

The inkjet recording system includes a system of ejecting a large number of small-volume ink droplets of a so-called photo ink having a low concentration, a system of improving the image quality by using a plurality of inks having substantially the same color hue but differing in the concentration, and a system using a colorless transparent ink.

The inkjet recording ink of the present invention can also be used for the uses other than the inkjet recording, such as a material for display image, an image-forming material for interior decoration and an image-forming material for outdoor decoration.

Examples of the material for display image include various materials such as poster, wall paper, ornamental articles (e.g., decorative figurine, doll), handbill for commercial advertisement, wrapping paper, wrapping material, paper bag, vinyl bag, package material, billboard, image drawn on or attached to the side surface of transportation facilities (e.g., automobile, bus, electric car), and clothing with a logo. In the case of using the dye of the present invention as a material for forming a display image, the image includes not only a narrow definition of image but also all patterns by an ink, which can be acknowledged by a human, such as abstract design, letter and geometrical pattern.

Examples of the material for interior decoration include various materials such as wall paper, ornamental articles (e.g., decorative figurine, doll), luminaire member, furniture member and design member of floor or ceiling. In the case of using the ink of the present invention as a material for forming an image, the image includes not only a narrow definition of image but also all patterns by an ink, which can be acknowledged by a human, such as abstract design, letter and geometrical pattern.

Examples of the material for outdoor decoration include various materials such as wall material, roofing material, billboard, gardening material, outdoor ornamental articles (e.g., decorative figurine, doll) and outdoor luminaire member. In the case of using the ink of the present invention as a material for forming an image, the image includes not only a narrow definition of image but also all patterns by an ink, which can be acknowledged by a human, such as abstract design, letter and geometrical pattern.

In these uses, examples of the medium on which the pattern is formed include various materials such as paper, fiber, cloth (including non-woven fabric), plastic, metal and ceramic. Examples of the dyeing form include mordanting, printing and fixing of a dye in the form of a reactive dye having introduced thereinto a reactive group. Among these, preferred is dyeing by mordanting.

The present invention is described below by referring to Examples, however, the present invention is not limited thereto.

EXAMPLES

Deionized water was added to the following components to make 1 liter and the mixture was stirred for 1 hour under heating at 30 to 40° C. and then filtered under reduced pressure through a microfilter having an average pore size of 0.25 μm to prepare Light Magenta Ink Solution LM-101.

[Formulation of Light Magenta Ink LM-101]

(Solid Contents)

| | |
|---|---|
| Magenta Dye (MD-1) | 7.5 g/liter |
| Urea | 37 g/liter |

(Liquid Components)

| | |
|---|---|
| Diethylene glycol (DEG) | 140 g/liter |
| Glycerin (GR) | 120 g/liter |
| Triethylene glycol monobutyl ether (TGB) | 120 g/liter |
| Triethanolamine (TEA) | 6.9 g/liter |
| Surfynol STG (SW) | 10 g/liter |

Also, Magenta Ink Solution M-101 was prepared by increasing Magenta Dye (MD-1) to 23 g in the formulation above.

[Formulation of Magenta Ink M-101]

(Solid Contents)

| | |
|---|---|
| Magenta Dye (MD-1) | 23 g/liter |
| Urea | 37 g/liter |

(Liquid Components)

| | |
|---|---|
| Diethylene glycol (DEG) | 140 g/liter |
| Glycerin (GR) | 120 g/liter |
| Triethylene glycol monobutyl ether (TGB) | 120 g/liter |
| Triethanolamine (TEA) | 6.9 g/liter |
| Surfynol STG (SW) | 10 g/liter |

Inks LM-102 to LM-108 and Inks M-102 to M-108 each having the same composition as LM-101 or M-101 except for adding the additive shown below to LM-101 or M-101 were produced.

| | Surfactant |
|---|---|
| LM-101, M-101 (Comparative Example) | 10 g/liter of SW |
| LM-102, M-102 (Comparative Example) | 3 g/liter of X1-14 to both LM-102 and M-102 |
| LM-103, M-103 (Comparative Example) | 4 g/liter of X2-3 to both LM-103 and M-103 |
| LM-104, M-104 (Comparative Example) | 3 g/liter of X2-6 to both LM-104 and M-104 |
| LM-105, M-105 (Invention) | 3 g/liter of X1-14 to LM-105 and 10 g/liter of X1-14 to M-105 |
| LM-106, M-106 (Invention) | 4 g/liter of X2-3 to LM-106 and 10 g/liter of X1-14 to M-106 |
| LM-107, M-107 (Invention) | 3 g/liter of X2-6 to LM-107 and 10 g/liter of X2-6 to M-107 |
| LM-108, M-108 (Invention) | 3 g/liter of X1-14 to LM-108 and 10 g/liter of X2-3 to M-108 |

MD-1:

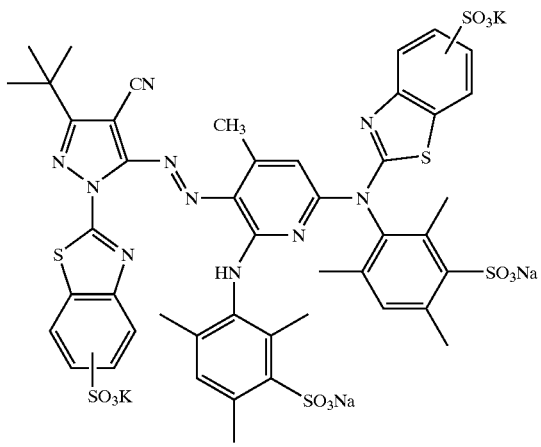

The magenta inks and light magenta inks each was filled in a margenta ink-light magenta ink cartridge of Inkjet Printer PM-950C manufactured by Seiko Epson Corporation and by using the inks of PM-950C for other colors, a magenta monochromatic image was printed. The image was printed on Inkjet Photo Gloss Paper "GASAI" produced by Fuji Photo Film, Co., Ltd. used as the image-receiving sheet, and the image quality and fastness of image under high humidity conditions were evaluated.

(Evaluation Test)

[Evaluation of Image Durability (Bleeding) Under High Humidity Conditions]

In the evaluation of bleeding of the image under high humidity conditions, a printing pattern was prepared. The printing pattern included four magenta square patterns each having a size of 3 cm×3 cm, arrayed to form a two-row and two-column table shape with a 1-mm white clearance between the respective square patterns. After the printing pattern was stored under conditions of 25° C. and 90% RH for 72 hours, bleeding of the magenta dye in the white clearance was observed. The increase of magenta density in the white clearance to the magenta density immediately after printing was measured by a magenta filter of Status A, and a case wherein the increase of magenta density was less than 0.01 was rated A, a case, wherein the increase of magenta density was from 0.01 to 0.05 was rated B, and a case wherein the increase of magenta density was more than 0.05 was rated C.

The results obtained are shown in the table below.

|  | M Bleeding |
|---|---|
| Genuine ink of EPSON (PM-950C) | B |
| LM-101, M-101 (Comparative Example) | C |
| LM-102, M-102 (Comparative Example) | B |
| LM-103, M-103 (Comparative Example) | B |
| LM-104, M-104 (Comparative Example) | B |
| LM-105, M-105 (Invention) | A |
| LM-106, M-106 (Invention) | A |
| LM-107, M-L07 (Invention) | A |
| LM-108, M-108 (Invention) | A |

As seen from the results in the table above, the systems using the ink set of the present invention are superior to Comparative Examples in view of M bleeding.

Even when the ink and ink set of the present invention were used in a thermal inkjet printer, the same preferable effect was obtained.

According to the present invention, an inkjet ink set and an inkjet recording method, which are ensured with excellent image durability under high humidity conditions, can be obtained.

The entire disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. An inkjet ink set comprising at least two inkjet inks having the same color hue but different dye concentration and each comprising water, a water-soluble organic solvent, a dye and a betaine compound, wherein concentration of the betaine compound in an ink having a highest dye concentration is higher than that in an ink having a lowest dye concentration.

2. The ink set as claimed in claim 1, wherein at least one of the betaine compounds is a compound represented by the following formula (1):

$$(R)_p\text{—}N\text{—}[L\text{—}(COOM)_q]_r \qquad (1)$$

wherein R represents a hydrogen atom, an alkyl group, an aryl group or a heterocyclic group; L represents a divalent linking group; M represents a hydrogen atom, an alkali metal atom, an ammonium group, a protonated organic amine or nitrogen-containing heterocyclic group or a quaternary ammonium ion group, provided that when the COOM forms a counter ion (COO$^-$) to an ammonium ion formed by the N atom (protonated ammonium atom ($=N^+=$)) in the formula, M is not present; q represents an integer of 1 or more; r represents an integer of 1 to 4; p represents an integer of 0 to 4, provided that p+r is 3 or 4; when p+r is 4, the N atom forms a protonated ammonium atom ($=N^+=$); when q is 2 or more, COOMs may be the same or different; when r is 2 or more, L—(COOM)$_q$s may be the same or different; and when p is 2 or more, Rs may be the same or different.

3. The ink set as claimed in claim 1, wherein among the inks having the same color hue, the concentration of the betaine compound increases with increase in the dye concentration.

4. The ink set as claimed in claim 1, wherein the betaine compound is a betaine-base surfactant.

5. The ink set as claimed in claim 1, wherein the betaine compound is a compound having both a cationic site and an anionic site in the molecule thereof.

6. The ink set as claimed in claim 5, wherein the cationic site is at least one member selected from an aminic nitrogen atom, a nitrogen atom of a heteroaromatic ring, a boron atom having 4 bonds to carbon and a phosphoric atom and the anionic site is at least one member selected from a hydroxyl group, a thio group, a sulfonamido group, a sulfo groups a carboxyl group, an imido group, a phosphoric acid group and a phosphonic acid group.

7. The ink set as claimed in claim 1, wherein the dye is a dye having an oxidation potential more positive then 1.0 V (vs SCE).

8. The ink set as claimed in claim 1, wherein the dye is a dye having at least two heterocyclic groups.

9. The ink set as claimed in claim 8, wherein at least one of the heterocyclic groups is a 5-membered or 6-membered heterocyclic group containing at least one hetero atom selected from a nitrogen atom, an oxygen atom and a sulfur atom.

10. The ink set as claimed in claim 9, wherein the heterocyclic group contains at least one heterocyclic ring selected from pyridine, thiophene, thiazole, benzothiazole, benzoxazole and furan.

11. An inkjet recording method comprising recording an image by an inkjet printer using the ink set as claimed in claim 1.

* * * * *